United States Patent [19]
Kodama et al.

[11] Patent Number: 5,847,875
[45] Date of Patent: Dec. 8, 1998

[54] ZOOM LENS

[75] Inventors: Naoko Kodama, Kawasaki; Koichi Ohshita, Tokyo, both of Japan

[73] Assignee: Nikon Corporation, Tokyo, Japan

[21] Appl. No.: 955,318

[22] Filed: Oct. 21, 1997

Related U.S. Application Data

[62] Division of Ser. No. 731,774, Oct. 18, 1996, Pat. No. 5,774,267.

[30] Foreign Application Priority Data

| Oct. 20, 1995 | [JP] | Japan | 7-297867 |
| Feb. 22, 1996 | [JP] | Japan | 8-059969 |

[51] Int. Cl.$^6$ ............................. G02B 27/64; G02B 15/14
[52] U.S. Cl. ......................... 359/557; 359/676; 359/684; 359/682
[58] Field of Search ..................... 359/557, 684, 359/682, 681, 676

[56] References Cited

U.S. PATENT DOCUMENTS

| 5,040,881 | 8/1991 | Tsuji . |
| 5,270,857 | 12/1993 | Oizumi et al. . |
| 5,276,553 | 1/1994 | Tatsuno . |
| 5,337,187 | 8/1994 | Fukino et al. . |
| 5,638,210 | 6/1997 | Sato et al. . |
| 5,666,230 | 9/1997 | Tatsuno . |
| 5,668,668 | 9/1997 | Shibayama et al. ............. 359/684 |
| 5,684,639 | 11/1997 | Ohtake ........................... 359/684 |

FOREIGN PATENT DOCUMENTS

| 59-15214 | 1/1984 | Japan . |
| 63-241511 | 10/1988 | Japan . |
| 1-189621 | 7/1989 | Japan . |
| 1-191112 | 8/1989 | Japan . |
| 1-191113 | 8/1989 | Japan . |
| 1-284823 | 11/1989 | Japan . |
| 2-201310 | 8/1990 | Japan . |
| 2-244110 | 9/1990 | Japan . |
| 3-228008 | 10/1991 | Japan . |
| 3-235908 | 10/1991 | Japan . |
| 4-15612 | 1/1992 | Japan . |
| 5-142475A | 6/1993 | Japan . |
| 5-173070 | 7/1993 | Japan . |
| 5-173071 | 7/1993 | Japan . |
| 7-306362 | 11/1995 | Japan . |

Primary Examiner—Georgia Y. Epps
Assistant Examiner—Evelyn A. Lester
Attorney, Agent, or Firm—Oliff & Berridge, PLC

[57] ABSTRACT

A large diameter zoom lens includes a large zooming ratio which is capable of faster auto focussing (AF). A zoom lens, having a zooming ratio of not less than 1.5, includes, in order from an object side to an image side, a first lens group having negative refractive power, a second lens group having positive refractive power, a third lens group having positive refractive power, a fourth lens group having negative refractive power and a fifth lens group having positive refractive power, wherein during zooming from a maximum wide-angle state to a maximum telephoto state, the lateral magnification of the second lens group is always positive and decreases monotonically, and predetermined conditional equations are satisfied. The zoom lens includes, in order from the object side, a first lens group having a negative refractive power and a second lens group having a positive refractive power, wherein the second lens group includes, in order from the object side, a front group having a positive refractive power and a rear group having a positive refractive power, and when zooming from the maximum wide-angle state to the maximum telephoto state, the front group and the rear group move integrally and the lateral magnification of the front group at the infinite focus state is always positive and decreases monotonically.

27 Claims, 28 Drawing Sheets

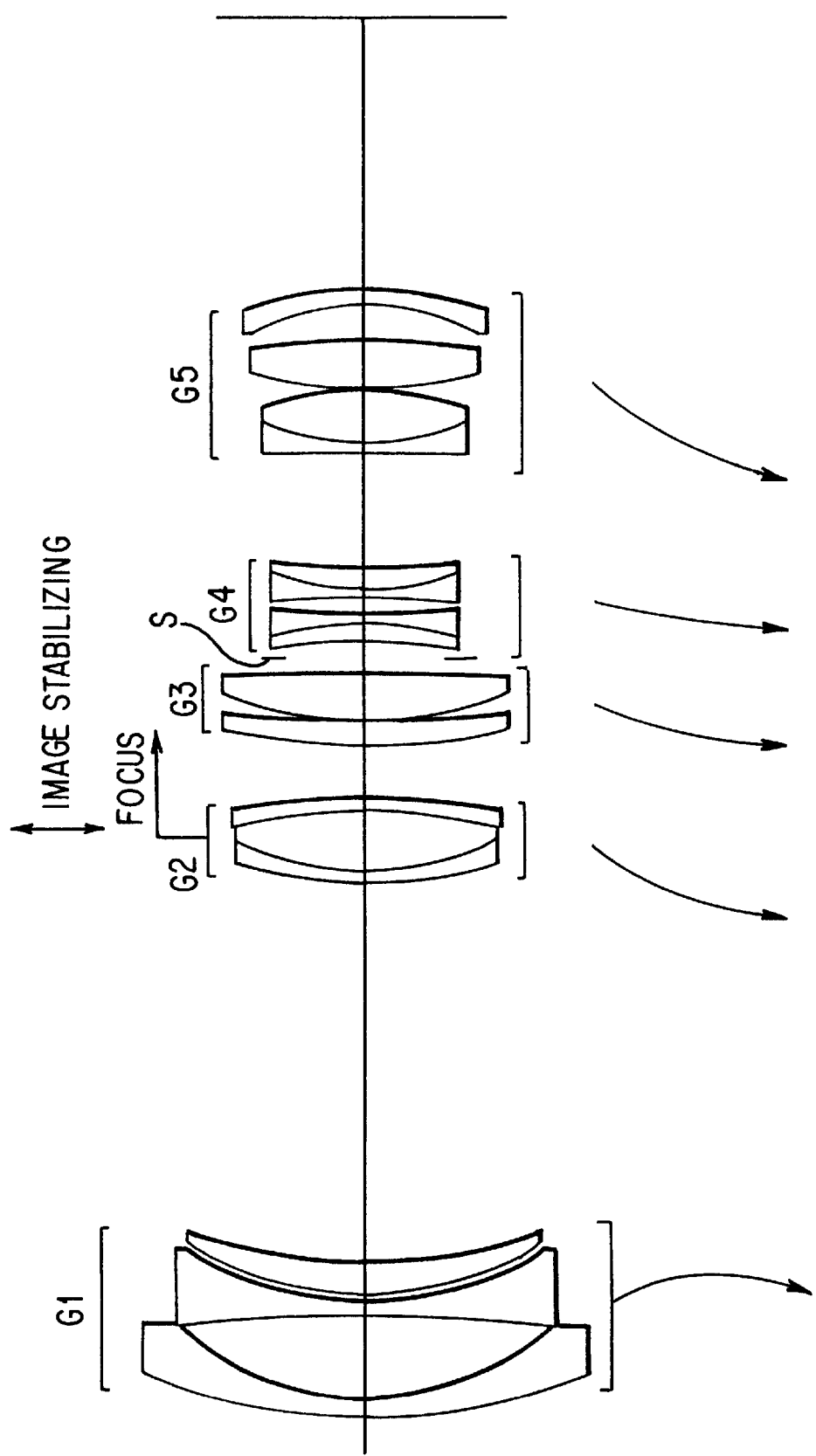

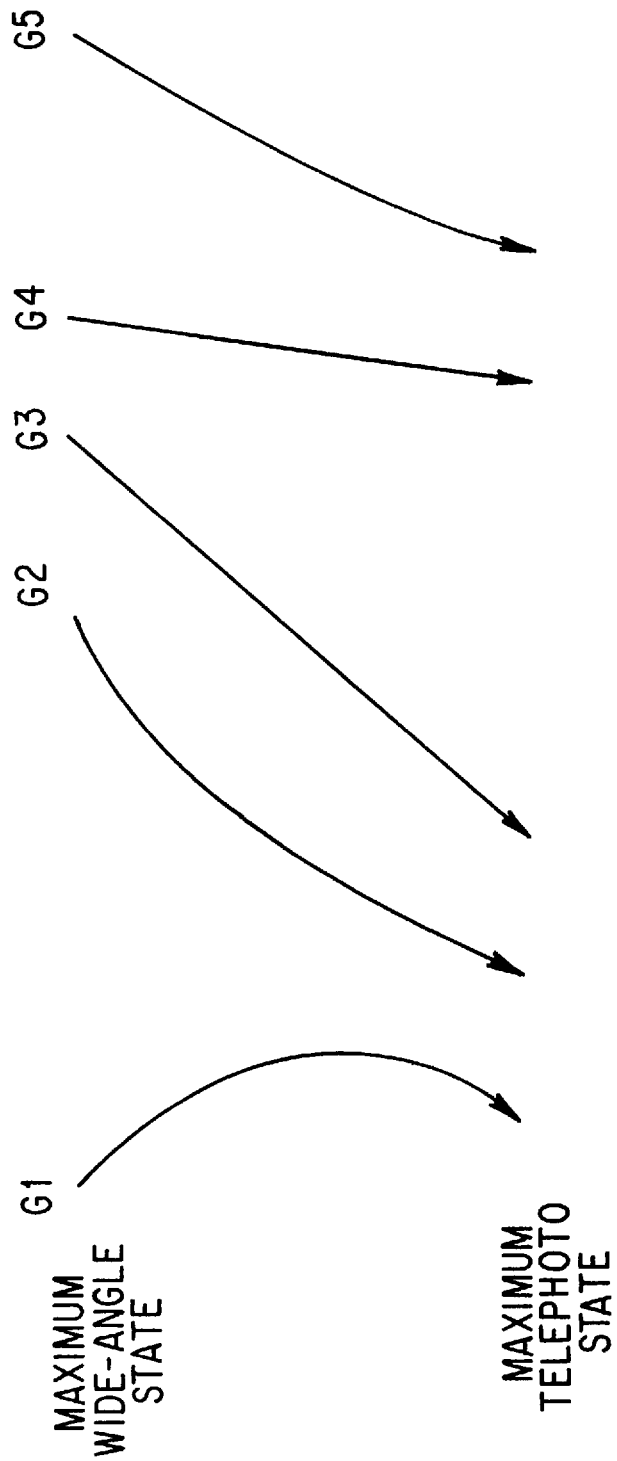

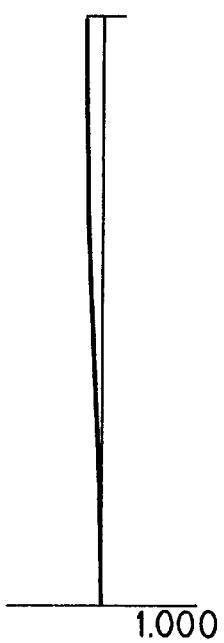
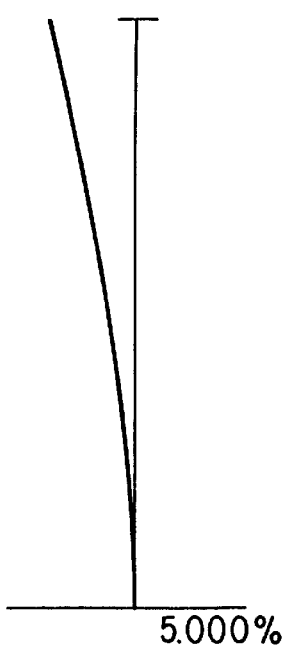
FNO=2.89
SPHERICAL ABERRATION
FIG. 3(a)
Y=21.60
ASTIGMATISM
FIG. 3(b)
Y=21.60
DISTORTION ABERRATION
FIG. 3(c)
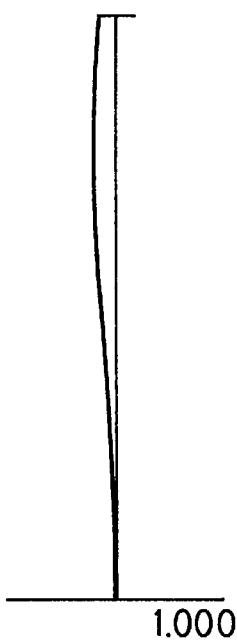
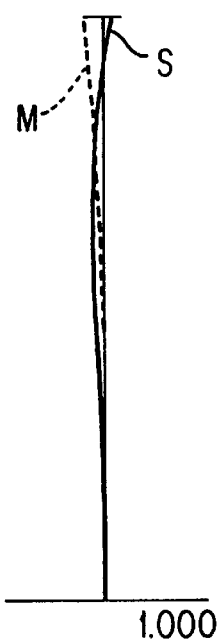
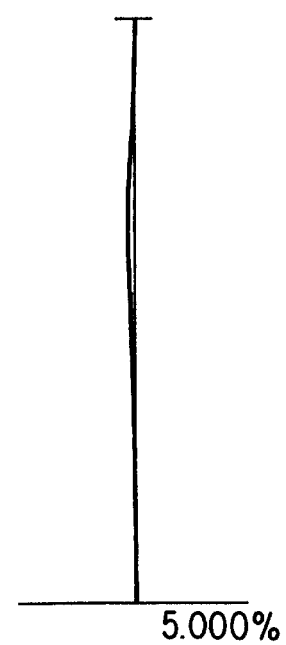
FNO=2.89
SPHERICAL ABERRATION
FIG. 4(a)
Y=21.60
ASTIGMATISM
FIG. 4(b)
Y=21.60
DISTORTION ABERRATION
FIG. 4(c)

FNO=2.90

SPHERICAL
ABERRATION

Y=21.60

ASTIGMATISM

Y=21.60

DISTORTION
ABERRATION

NA=0.17

SPHERICAL
ABERRATION

Y=21.60

ASTIGMATISM

Y=21.60

DISTORTION
ABERRATION

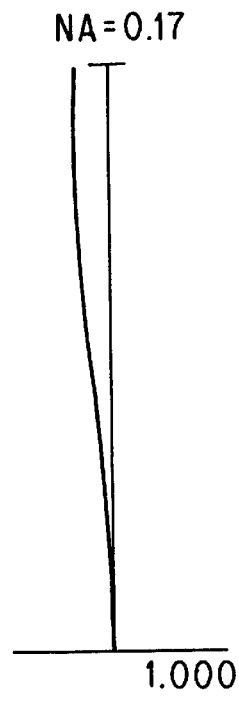
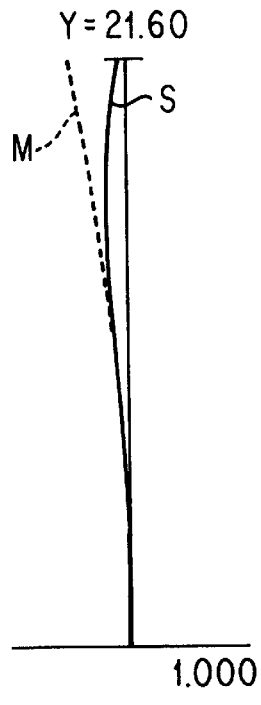
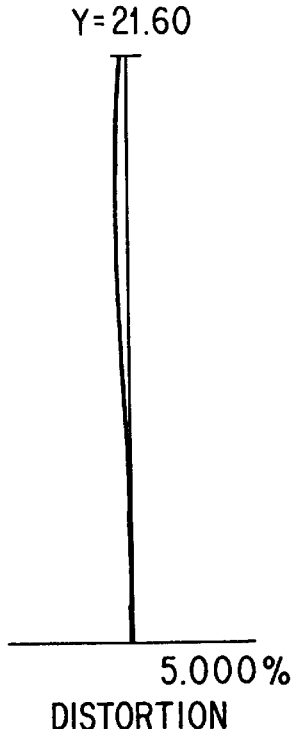
FIG. 7(a) SPHERICAL ABERRATION  
FIG. 7(b) ASTIGMATISM  
FIG. 7(c) DISTORTION ABERRATION
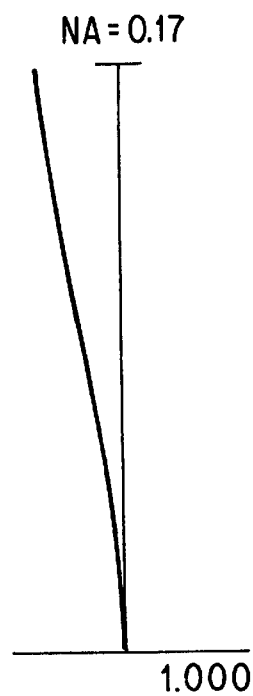
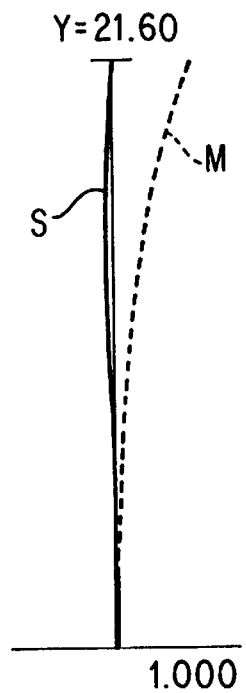
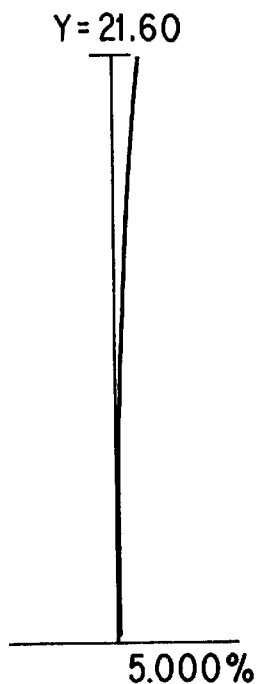
FIG. 8(a) SPHERICAL ABERRATION  
FIG. 8(b) ASTIGMATISM  
FIG. 8(c) DISTORTION ABERRATION

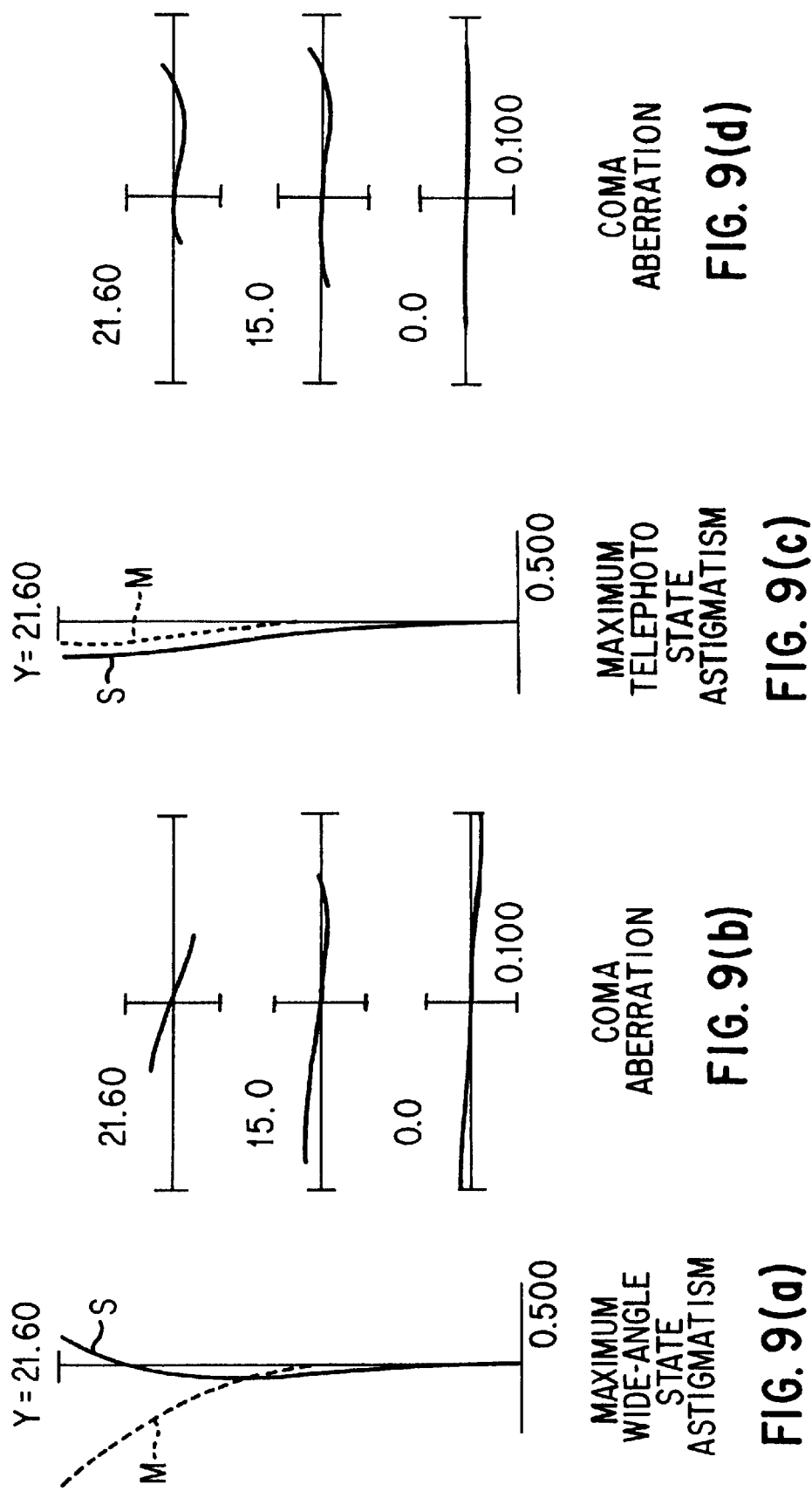

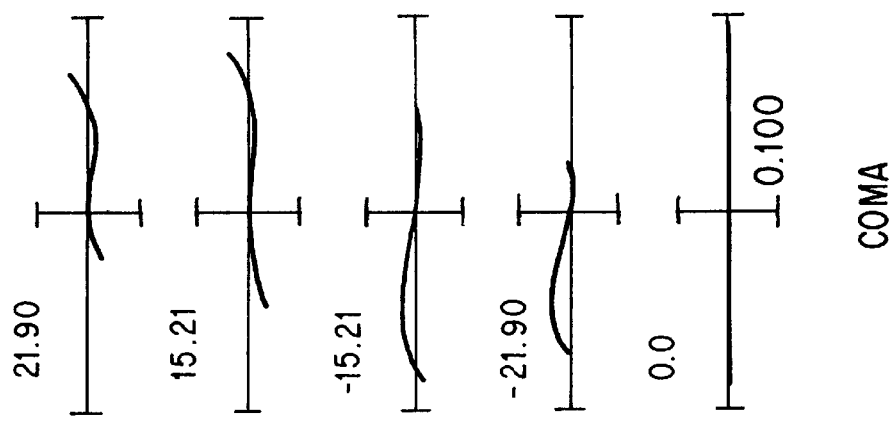
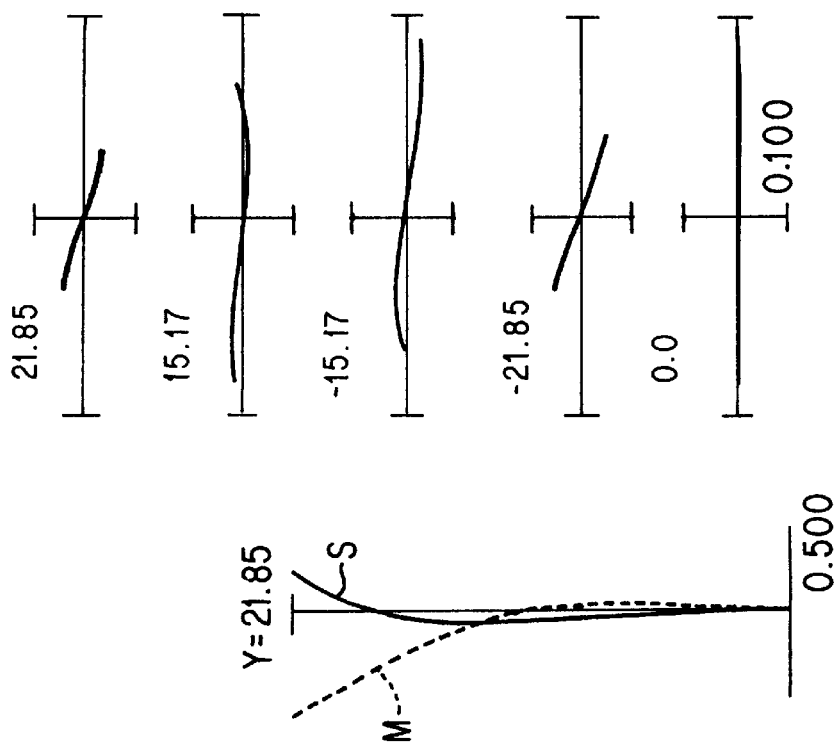

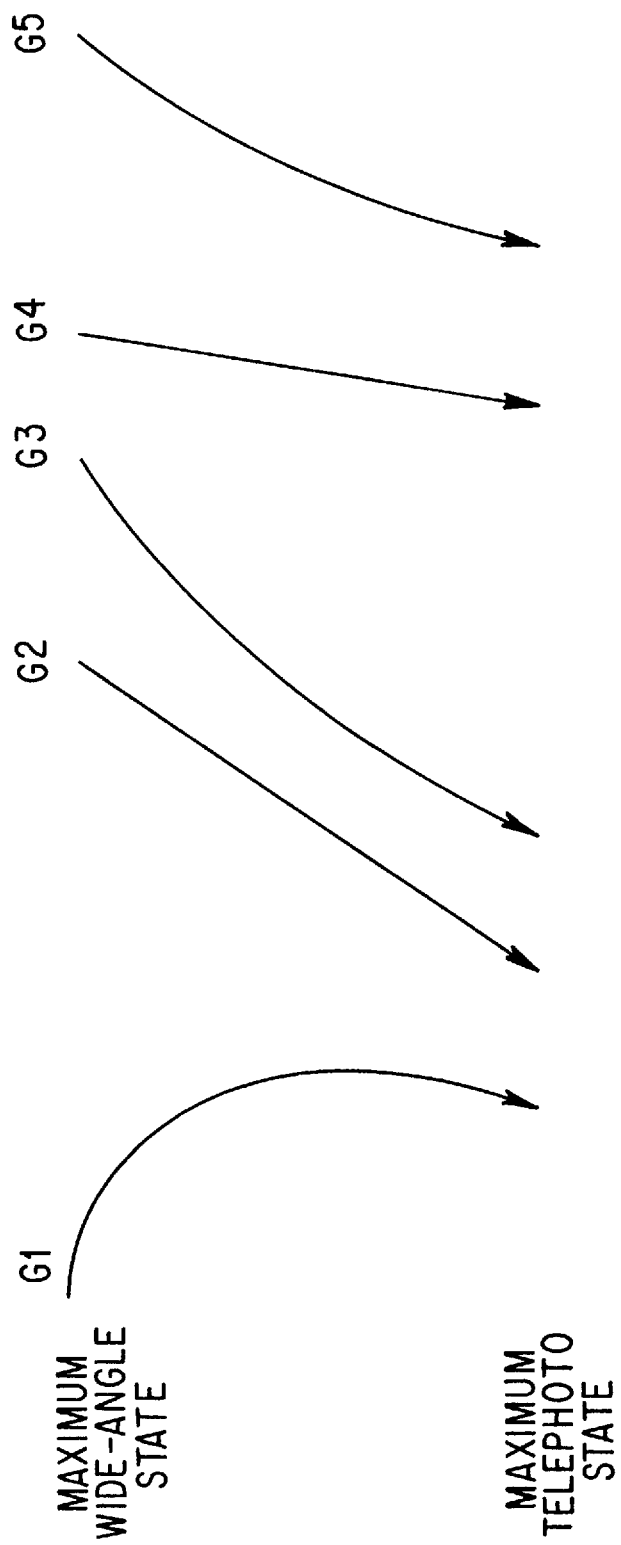

FNO = 2.90

SPHERICAL
ABERRATION

Y= 21.60

ASTIGMATISM

Y=21.60

DISTORTION
ABERRATION

FNO = 2.90

SPHERICAL
ABERRATION

Y=21.60

ASTIGMATISM

Y=21.60

DISTORTION
ABERRATION

FNO=2.90

SPHERICAL
ABERRATION

Y=21.60

ASTIGMATISM

Y=21.60

DISTORTION
ABERRATION

NA=0.17

SPHERICAL
ABERRATION

Y=21.60

ASTIGMATISM

Y=21.60

DISTORTION
ABERRATION

SPHERICAL ABERRATION

ASTIGMATISM

DISTORTION ABERRATION

SPHERICAL ABERRATION

ASTIGMATISM

DISTORTION ABERRATION

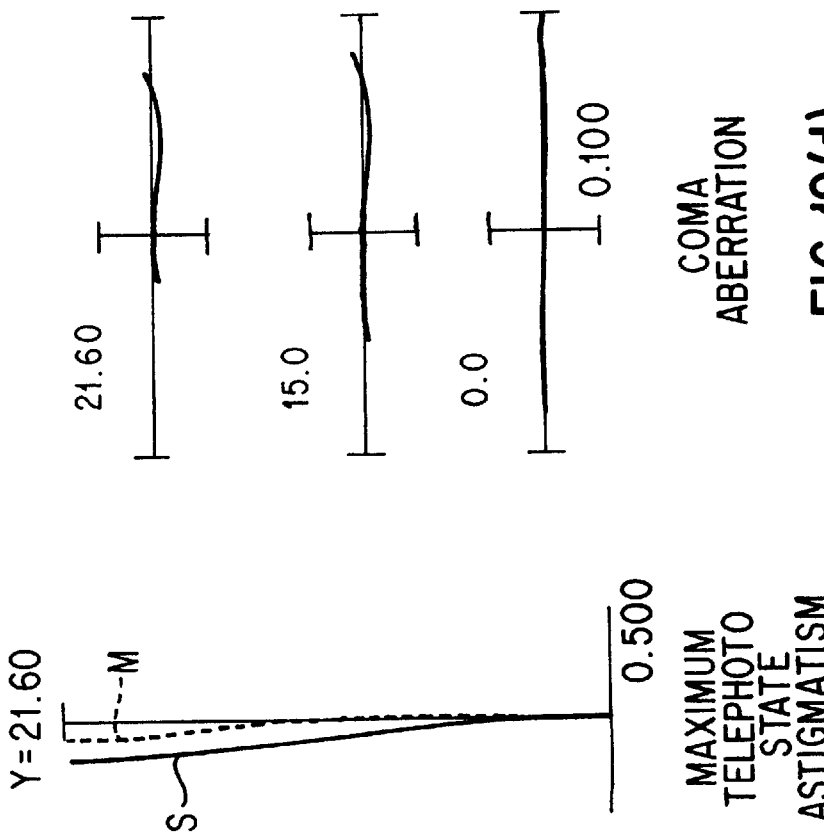
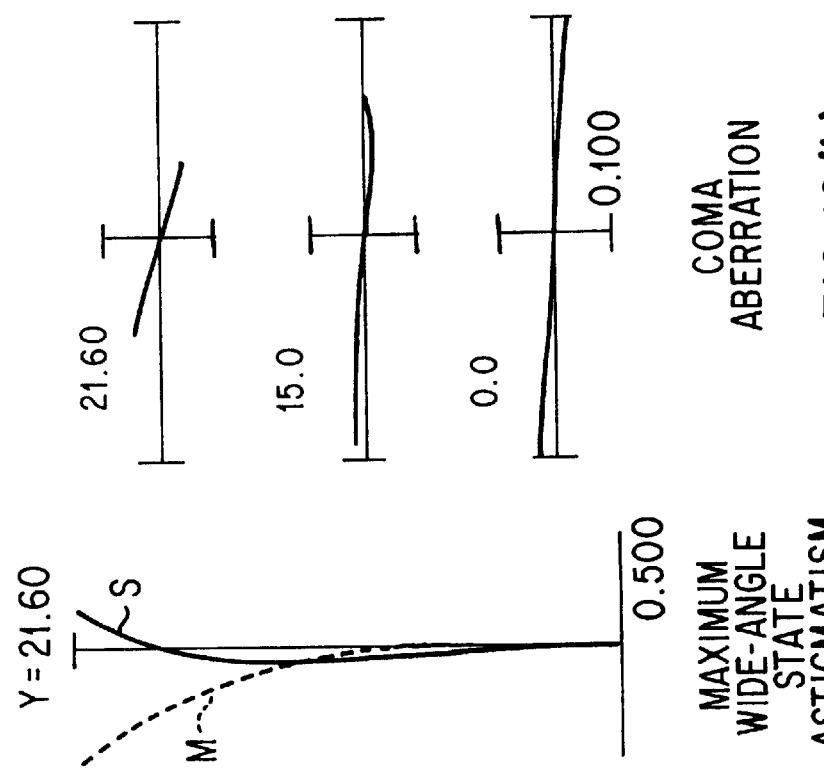

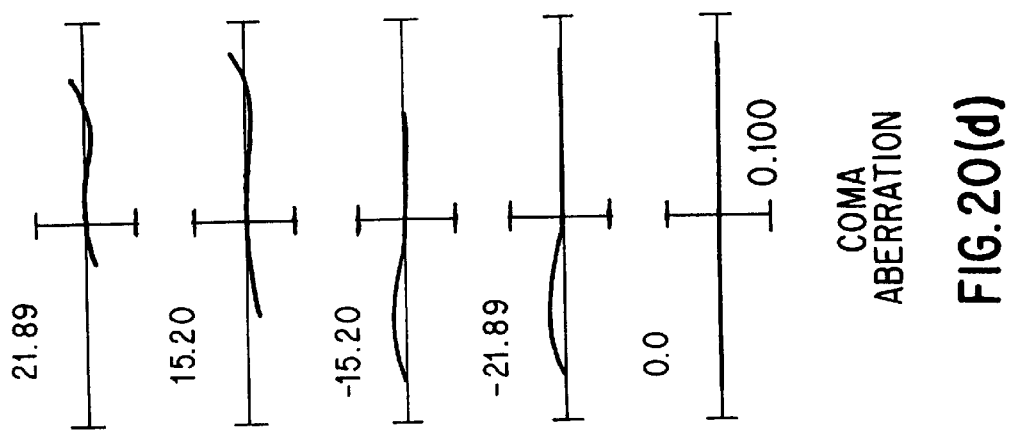
FIG. 20(c) MAXIMUM TELEPHOTO STATE ASTIGMATISM
FIG. 20(d) COMA ABERRATION
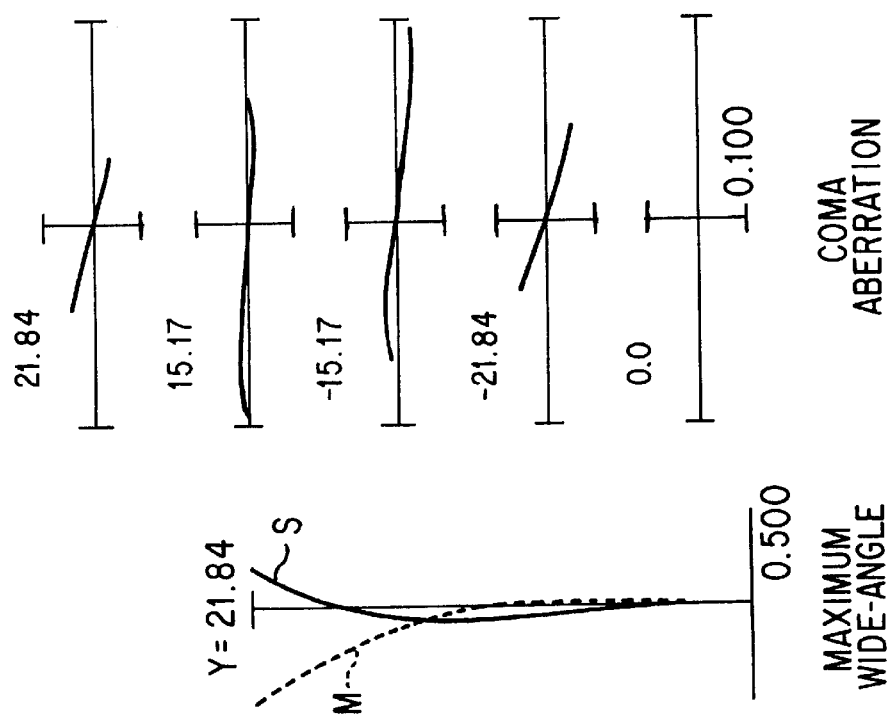
FIG. 20(a) MAXIMUM WIDE-ANGLE STATE ASTIGMATISM
FIG. 20(b) COMA ABERRATION

SPHERICAL
ABERRATION

ASTIGMATISM

DISTORTION
ABERRATION

SPHERICAL
ABERRATION

ASTIGMATISM

DISTORTION
ABERRATION

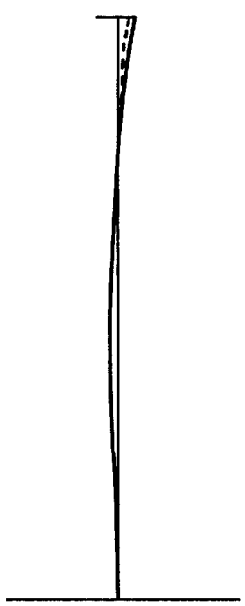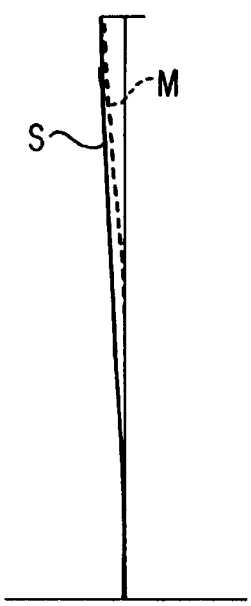
FIG. 24(a) SPHERICAL ABERRATION
FIG. 24(b) ASTIGMATISM
FIG. 24(c) DISTORTION ABERRATION
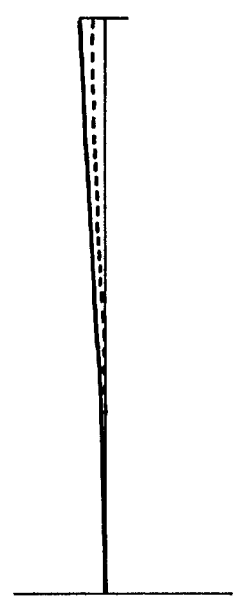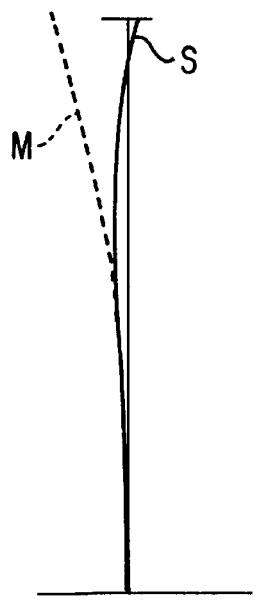
FIG. 25(a) SPHERICAL ABERRATION
FIG. 25(b) ASTIGMATISM
FIG. 25(c) DISTORTION ABERRATION

SPHERICAL
ABERRATION

ASTIGMATISM

DISTORTION
ABERRATION

SPHERICAL
ABERRATION

ASTIGMATISM

DISTORTION
ABERRATION

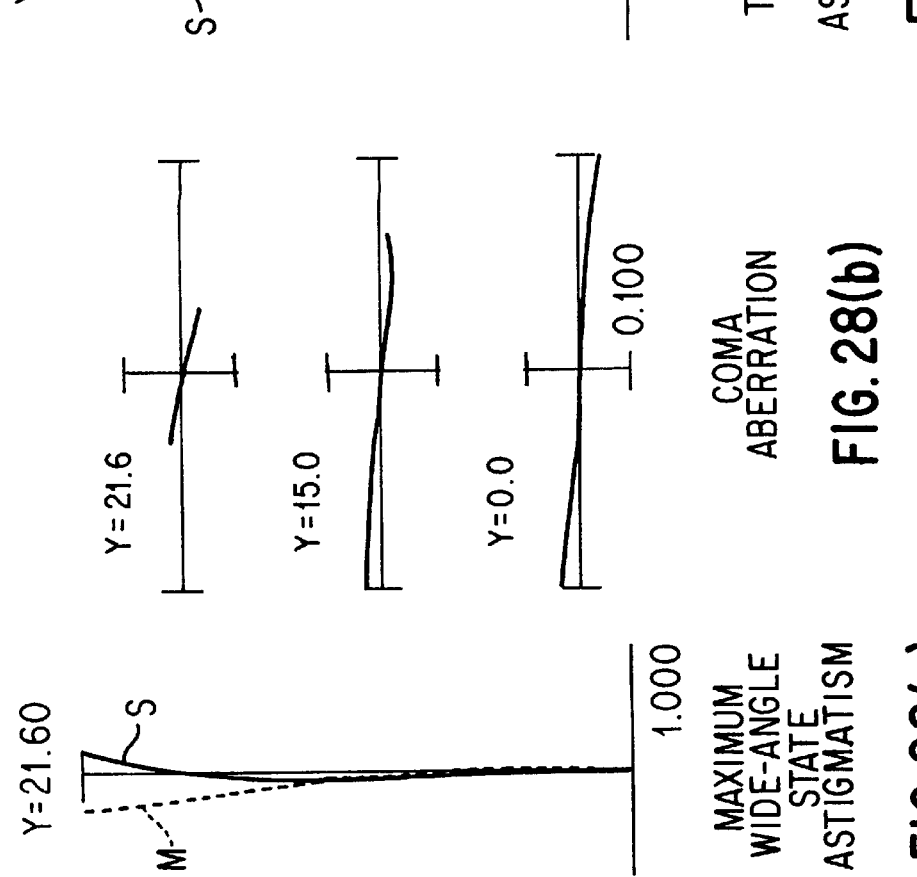
FIG.28(a) MAXIMUM WIDE-ANGLE STATE ASTIGMATISM
FIG.28(b) COMA ABERRATION
FIG.28(c) MAXIMUM TELEPHOTO STATE ASTIGMATISM
FIG.28(d) COMA ABERRATION

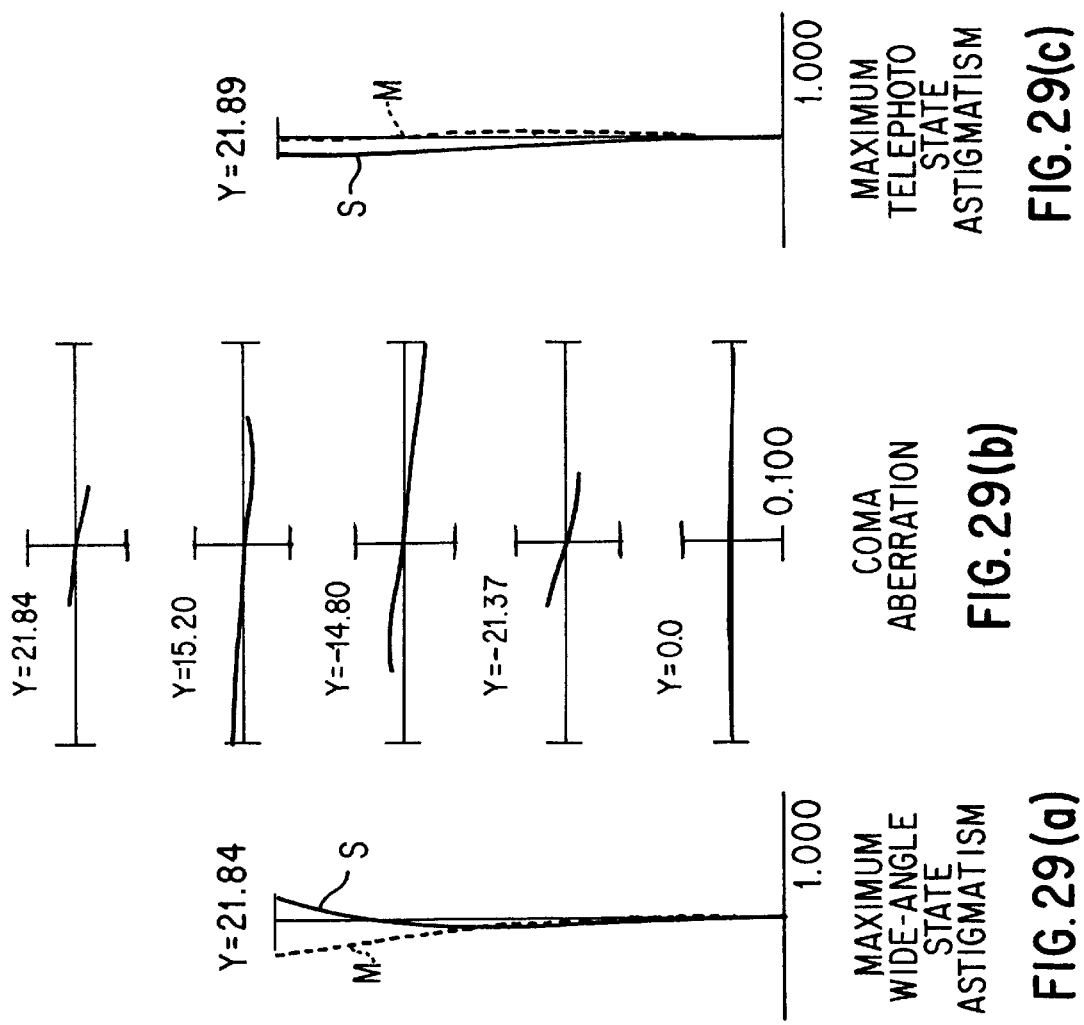

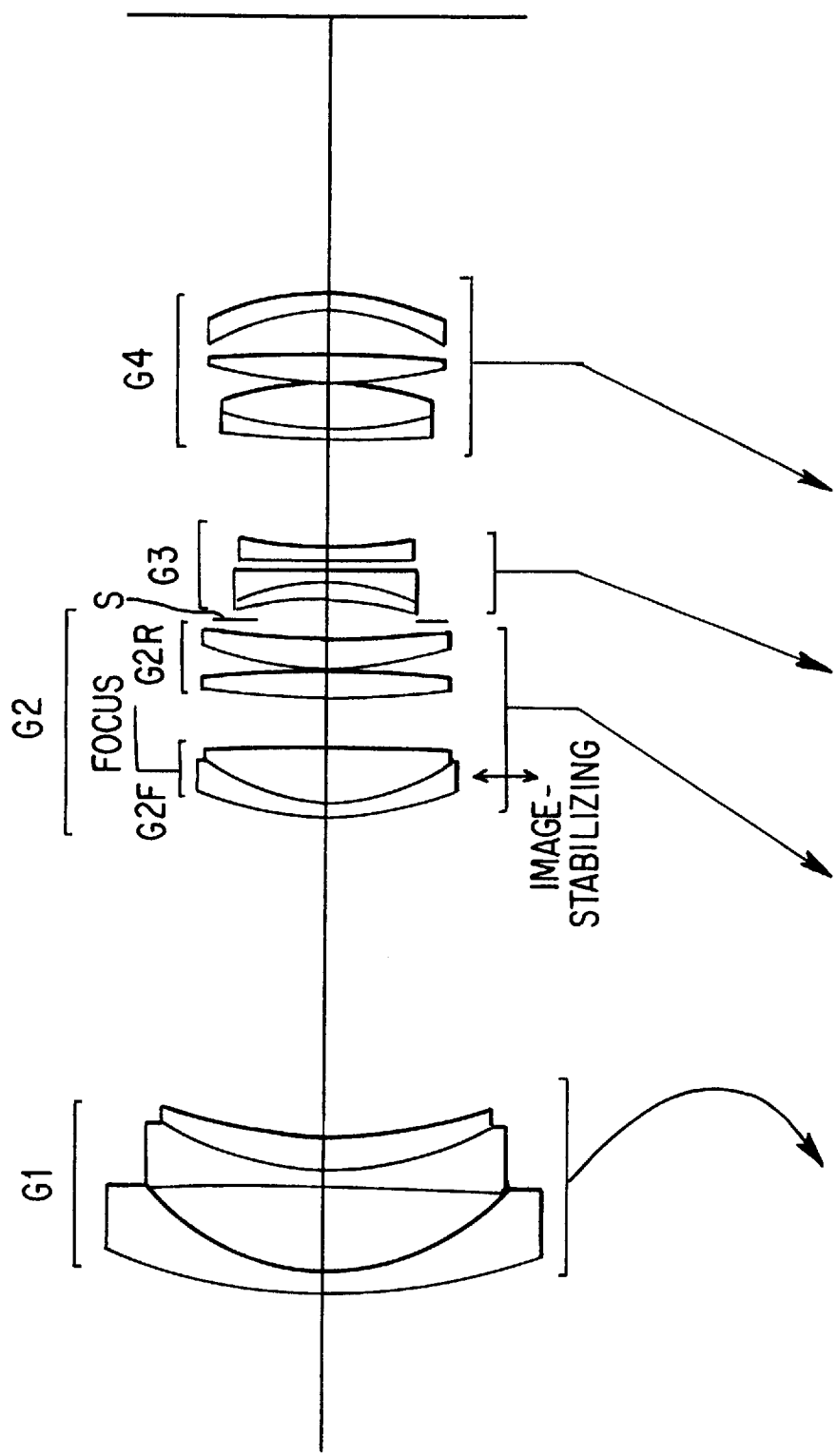

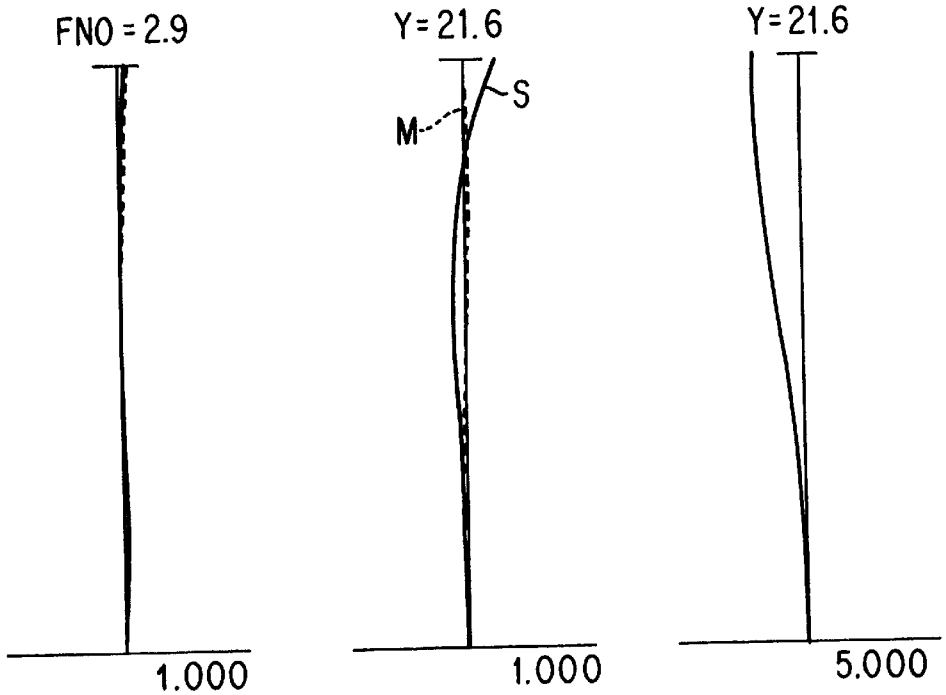
FIG. 31(a) SPHERICAL ABERRATION
FIG. 31(b) ASTIGMATISM
FIG. 31(c) DISTORTION ABERRATION
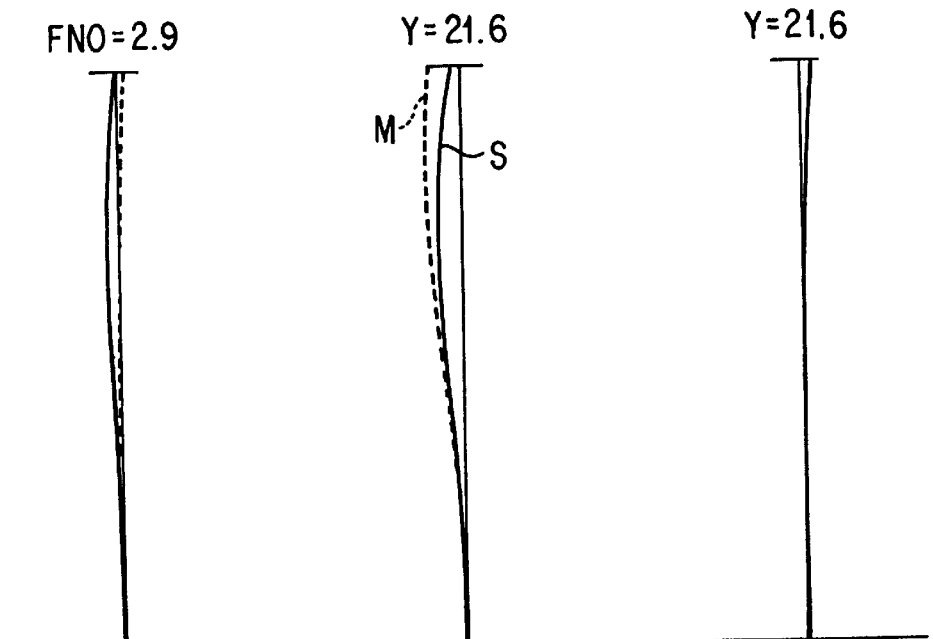
FIG. 32(a) SPHERICAL ABERRATION
FIG. 32(b) ASTIGMATISM
FIG. 32(c) DISTORTION ABERRATION

SPHERICAL
ABERRATION

ASTIGMATISM

DISTORTION
ABERRATION

SPHERICAL
ABERRATION

ASTIGMATISM

DISTORTION
ABERRATION

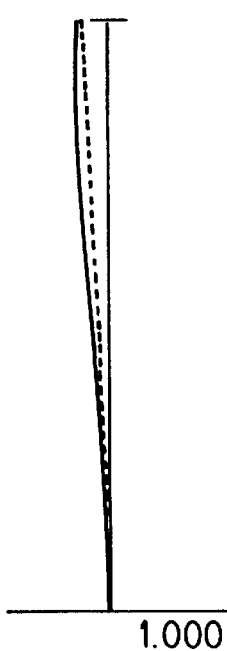
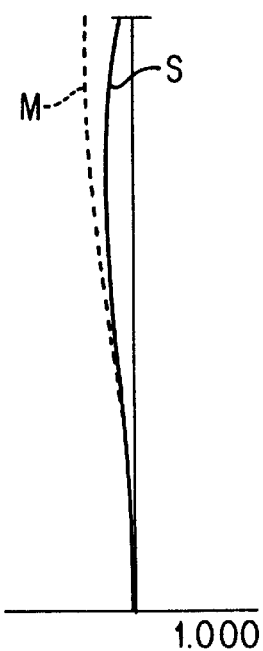
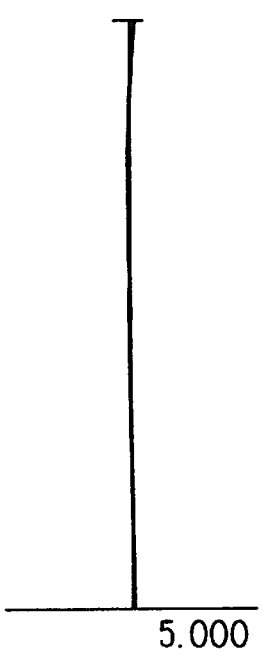
FIG. 35(a) SPHERICAL ABERRATION
FIG. 35(b) ASTIGMATISM
FIG. 35(c) DISTORTION ABERRATION
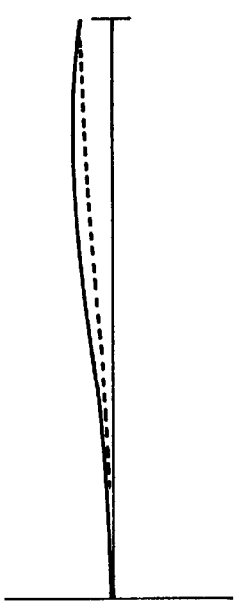
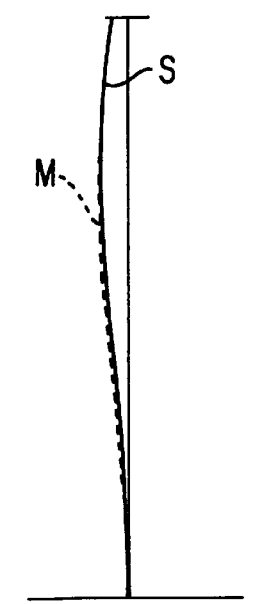
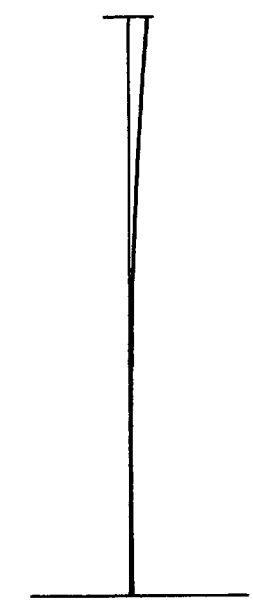
FIG. 36(a) SPHERICAL ABERRATION
FIG. 36(b) ASTIGMATISM
FIG. 36(c) DISTORTION ABERRATION

FNO=2.9

SPHERICAL
ABERRATION

Y=21.6

ASTIGMATISM

Y=21.6

DISTORTION
ABERRATION

FNO=2.9

SPHERICAL
ABERRATION

Y=21.6

ASTIGMATISM

Y=21.6

DISTORTION
ABERRATION

FNO=2.9

SPHERICAL ABERRATION

Y=21.6

ASTIGMATISM

Y=21.6

DISTORTION ABERRATION

NA=0.17

SPHERICAL ABERRATION

Y=21.6

ASTIGMATISM

Y=21.6

DISTORTION ABERRATION

SPHERICAL
ABERRATION

ASTIGMATISM

DISTORTION
ABERRATION

SPHERICAL
ABERRATION

ASTIGMATISM

DISTORTION
ABERRATION

ZOOM LENS

This is a Division of application Ser. No. 08/731,774, filed Oct. 18, 1996, now U.S. Pat. No. 5,774,267.

BACKGROUND OF THE INVENTION

1. Field of the Invention

The invention relates to a zoom lens used in a single lens reflex camera.

2. Description of Related Art

Conventionally, focussing of a zoom lens is achieved by moving the lens group closest to the object side. This focussing method can be realized with a very simple lens barrel structure. However, because the focal length of the lens group closest to the object side, that is, the first lens group, is long, the required displacement (focussing displacement) of the lens in order to accomplish focussing is large, which causes an increase in the size and weight of the lens system.

To overcome the above disadvantage, a method has been proposed for accomplishing focussing by dividing the first lens group into a plurality of partial lens groups and causing only a one of the plurality of partial lens groups to move. For example, in Japanese Laid-Open Patent Publications Nos. 59-15214 and 2-244110 focussing is accomplished by dividing the first lens group having positive refractive power into two lens groups, namely a front lens group having positive refractive power and a back lens group having negative refractive power, and by causing the back lens group having negative refractive power to move.

In addition, in Japanese Laid-Open Patent Publications Nos. 2-201310 and 4-15612, focussing is accomplished by dividing the first lens group having negative refractive power into two lens groups, namely a front lens group having either negative refractive power or positive refractive power and a back lens group having negative refractive power, and by causing the back lens group having negative refractive power to move. However, in Japanese Laid-Open Patent Publication No. 3-228008, focussing is accomplished by causing the second lens group to move in a system comprised of four groups in a positive-negative-positive-positive refractive power arrangement.

In Japanese Laid-Open Patent Publications Nos. 5-173070 and 5-173071, a method is proposed for effecting focussing in a zoom lens system comprised of at least two lens groups in either a positive-negative or a negative-positive refractive power arrangement by dividing the second lens group into a front lens group having negative refractive power and a back lens group having negative refractive power or a front lens group having positive refractive power and a back lens group having positive refractive power, and by causing the front lens group to move.

Also, the image-stabilizing method has been know that corrects fluctuations in the image position caused by camera shaking. For example, methods that accomplish image-stabilizing are proposed in: Japanese Laid-Open Patent Publication No. 1-189621, in which lens system the first lens group is caused to move in a direction orthogonal to an optical axis of the lens system; Japanese Laid-Open Patent Publications Nos. 1-191112 and 1-284823, in which lens system the second lens group is caused to move in a direction orthogonal to the optical axis of the lens system; and Japanese Laid-Open Patent Publication No. 1-191113, in which the final lens group is caused to move orthogonal to the optical axis of the lens system.

With the focussing methods disclosed in Japanese Laid-Open Patent Publications Nos. 59-15214, 2-244110, 2-201310 and 4-15612 noted above, the size and weight of the lens system are reduced from focussing methods in which the entire lens group closest to the object side moves. However, in all of these it is necessary to move a component lens group which is a portion of the first lens group which is the largest lens group in the lens system, and consequently, it is difficult to increase substantially the driving efficiency in auto focus.

In contrast, the focussing method in Japanese Laid-Open Patent Publication No. 3-228008 accomplishes focussing by moving the second lens group, which has a small lens diameter, and consequently, faster focussing is possible. However, from the standpoint of aberration correction, it is difficult at present to apply this focussing method to a zoom lens having a large diameter at the maximum wide-angle state or at the maximum telephoto state.

With the focussing method disclosed in Japanese Laid-Open Patent Publications Nos. 5-173070 and 5-173071, faster focussing is possible and the lens system can be applied to a zoom lens having a large diameter at the maximum wide-angle state or at the maximum telephoto state. However, when this focussing method is applied to a zoom lens with a large zoom ratio, the change in the focussing distance becomes larger in proportion to the state of zooming. As a result, focussing is impossible with a substantially constant movement amount over the entire zooming range.

Further, with an image stabilizing method that causes the first lens group to move in a direction substantially orthogonal to the optical axis, such as the method disclosed in Japanese Laid-Open Patent Publication No. 1-189621, the lens group on the object side having the largest diameter ends up being driven when the method is applied to a large-diameter zoom lens such as in the invention. As a result, the driving mechanism which causes the lens group to move in a direction substantially orthogonal to the optical axis tends to become larger.

In addition, in the case of a method that causes the lens group closest to the image side to move, such as the method disclosed in Japanese Laid-Open Patent Publication No. 1-191113, a lens group which is separated from the aperture diaphragm is driven in a direction orthogonal to the optical axis of the lens system. As a result, when the method is applied to a zoom lens having a large diameter, such as in the invention, aberration fluctuations caused by eccentric driving of the lens group become large.

Furthermore, when a method that accomplishes image stabilizing by causing the entire second lens group to move, such as the methods disclosed in Japanese Laid-Open Patent Publications Nos. 1-284823 and 1-191112, is applied to a zoom lens having a large diameter, such as in the invention, aberration fluctuations caused by eccentric driving of the lens group become large.

SUMMARY OF THE INVENTION

In consideration of the foregoing, it is an objective of the invention to provide a large diameter zoom lens having a large zoom ratio with which faster auto focussing (AF) is possible. In addition, it is another objective of the invention to provide a large diameter zoom lens having a large zoom ratio and having an image-stabilizing function.

In order to resolve the above problems, the invention provides, according to first and second embodiments, a zoom lens with a zooming ratio of at least 1.5, and including, in order from an object side to an image side, a first lens group G1 having a negative refractive power, a second lens group G2 having a positive refractive power, a third lens group G3 having a positive refractive power, a fourth lens group G4 having a negative refractive power, and a fifth lens group G5 having a positive refractive power. When zooming from a maximum wide-angle state to a maximum telephoto state, a lateral magnification of the second lens group G2 is always positive and decreases monotonically. During zooming from the maximum wide-angle state to a maximum telephoto state, the following conditional equations are satisfied:

$$0.0 < \Delta X4/\Delta X2 < 0.3 \quad (0 < \Delta X4) \tag{1.1}$$

$$0.3 < \Delta X5/\Delta X2 < 0.75 \quad (0 < \Delta X5) \tag{2.1}$$

where $\Delta X2$ is a displacement of the second lens group G2 in a direction of the optical axis of the lens system from the maximum wide-angle state to the maximum telephoto state, $\Delta X4$ is a displacement of the fourth lens group G4 in the direction of the optical axis from the maximum wide-angle state to the maximum telephoto state, and $\Delta X5$ is a displacement of the fifth lens group G5 in the direction of the optical axis from the maximum wide-angle state to the maximum telephoto state.

With regard to the first and second embodiments of the invention, focussing on close-range objects is accomplished by causing the second lens group G2 to move along the optical axis. In addition, when zooming from the maximum wide-angle state to the maximum telephoto state, preferably the second lens group G2 moves along a locus which is convex toward the object side and the third lens group G3 moves along a substantially linear locus, or the second lens group G2 moves along a substantially linear locus and the third lens group G3 moves along a locus which is convex toward the object side.

Further, in the above-described embodiments of the invention, it is possible to accomplish image-stabilizing by causing the second lens group G2 to move, for example, in a direction transverse to the optical axis. In this case, it is preferable for the second lens group G2 to contain at least one cemented lens.

As noted above, with the invention the fourth lens group G4 and the fifth lens group G5 move so as to satisfy conditional equations (1.1) and (2.1), when zooming from the maximum wide-angle state to the maximum telephoto state. In comparison with a conventional negative-positive-negative-positive refractive power, four group structure, with the negative-positive-positive-negative-positive refractive power, five group structure of the invention, not only is it possible to increase the degree of freedom of aberration correction, but in the range stipulated by conditional equation (1.1) the second lens group G2 and the fourth lens group G4 move in the same direction and the driving speed of the fourth lens group G4 is slower than that of the second lens group G2. That is, during zooming the distance between the second lens group G2 and the fourth lens group G4 becomes larger at the maximum telephoto state than at the maximum wide-angle state.

When the distance between the second lens group G2 and the fourth lens group G4 becomes larger, light rays which are caused to converge by the second lens group G2 are incident on the fourth lens group G4 after being restricted without being spread out by the third lens group G3, which has a positive refractive power. Accordingly, when the diaphragm is positioned near the fourth lens group G4, it is possible to make the diaphragm diameter smaller and as a result to reduce the size of the optical system. In this way, the conditional equation (1.1) stipulates the displacement of the fourth lens group G4 with respect to the second lens group G2.

When the lower limit in the conditional equation (1.1) is breached, the second lens group G2 and the fourth lens group G4 move in mutually opposite directions, which is unfavorable. When the upper limit in the conditional equation (1.1) is breached, the convergence rate of the second lens group G2 becomes smaller and the refractive power of the second lens group G2 becomes stronger as the attempt is made to increase the convergence rate of the second lens group G2. As a result, aberration correction becomes difficult.

The conditional equation (2.1) stipulates the displacement of the fifth lens group G5 with respect to the second lens group G2. The larger the value of the conditional equation (2.1), the narrower the distance between the fourth lens group G4 and the fifth lens group G5 at the maximum telephoto state. When this kind of position is assumed, the difference in the heights of the surrounding light rays at the fourth lens group G4 between the maximum wide-angle state and the maximum telephoto state becomes larger, which is advantageous for correction of coma aberrations at the maximum telephoto state.

When the lower limit in the conditional equation (2.1) is breached, the distance between the fourth lens group G4 and the fifth lens group G5 does not become sufficiently narrow, making correction of the coma aberrations difficult. When the upper limit in the conditional equation (2.1) is breached, the displacement of the fifth lens group G5 becomes too large, so that the distance between the fifth lens group G5 and the fourth lens group G4 cannot be maintained and the total length of the lens system becomes longer.

In order to both increase the degree of freedom of aberration correction and simplify the lens barrel structure, rather than having both of the loci for the second lens group G2 and the third lens group G3 be non-linear, it is preferable to have one locus be substantially linear and the other locus be non-linear. This kind of locus shape is advantageous in aberration corrections across the entire range from the maximum wide-angle state to the maximum telephoto state. In particular, when zooming from the maximum wide-angle state to the maximum telephoto state, it is preferable for the second lens group G2 to move along a locus which is convex toward the object side and for the third lens group G3 to move along a substantially linear locus, or for the second lens group G2 to move along a substantially linear locus and the third lens group G3 to move along a locus which is convex toward the object side.

The structure of the first and second embodiments of the invention can be a thin near-axis optical system comprising, in order from the object side to the image side, an object-side lens group A (first lens group G1), which does not participate in focussing; a focussing lens group F (second lens group G2), which participates in focussing; and an image-side lens group B (lens groups from third lens group G3 on), which does not participate in focussing.

Further, the focal length of the object-side lens group A is denoted by $f_A$, the lateral magnification of the focussing lens group at the infinite focus state is denoted by $\beta_F$, and the focussing displacement (with movement from the object side toward the image side being positive) of the focussing lens group F in order to focus from an infinite object to an object at an object distance (distance between object and image) R is denoted by $\Delta X$.

Also, the length of the entire lens system (the distance along the optical axis from the object-side principal point of the object-side lens group A to the image plane) is denoted by TL, and the distance along the optical axis from the object-side principal point of the object-side lens group A to the object is denoted by $D_0$.

The relationship indicated by the following equation (a.1) is established, as disclosed in Japanese Laid-Open Patent Publication No. 5-173070:

$$(D_0 - f_A)\Delta X \approx (f_A{}^2 \times \beta_F{}^2)/(\beta_F{}^2 - 1) \qquad (a.1)$$

Differentiating the above equation (a) with respect to $\beta_F$, the relationship indicated by the following equation (b.1) is obtained:

$$\Delta X/d\beta_F = -2\beta_F/\{(\beta_F{}^2 - 1)^2(D_0 - f_A)\} \qquad (b.1)$$

With a general zoom lens, $(D_0 - f_A) > 0$ in equation (b.1). In addition, with the first and second embodiments of invention, the lateral magnification $\beta_F$ of the focussing lens group F (second lens group G2) at the infinite focus state is $\beta_F > 0$ from the maximum wide-angle state to the maximum telephoto state. Accordingly, the value on the right hand side of equation (b.1) is always negative, as shown in equation (c.1) below:

$$\Delta X/d\beta_F < 0 \qquad (c.1)$$

From equation (c.1), it can be seen that when the lateral magnification $\beta_F$ of the focussing lens group F at the infinite focus state monotonically decreases from the maximum wide-angle state to the maximum telephoto state, the focussing displacement $\Delta X$ of the focussing lens group F in order to focus from an object at infinity to a close-range object increases monotonically from the maximum wide-angle state to the maximum telephoto state.

With regard to the above discussion, $D_0$ is treated approximately as a constant. However, in actuality, $D_0$ changes with $\beta_F$, and consequently, when $D_0$ is a small value, there are cases where $\Delta X$ does not increase monotonically.

The shape of the focus cam is determined so that the shift of focus caused by the focus cam becomes smaller through the focussing displacement which changes monotonically (increases monotonically in the various embodiments) from the maximum wide-angle state to the maximum telephoto state overlapping with the displacement of the cam in the direction of the optical axis and the displacement in the direction of rotation, as disclosed in Japanese Laid-Open Patent Publications Nos. 3-235908 and 5-142475.

With the above-described embodiments of the invention, the focussing displacement increases monotonically when zooming from the maximum wide-angle state to the maximum telephoto state because of the above structure. As a result, it is possible to compose a focus cam capable of MF (manual focus) with little shift of focus, and it is possible to realize a zoom lens which has both high speed AF and MF with little shift of focus.

Further, it is preferable for the below conditional equation (3.1) to be satisfied in order to reduce the size of the complete lens system and to improve the close range aberration performance by reducing the focussing displacement:

$$1.0 < \Delta X_T/\Delta X_W < 1.5 \qquad (3.1)$$

where $\Delta X_T$ is a displacement of the second lens group G2 to focus from an object at infinity to a close-range object at the maximum wide-angle state, and $\Delta X_W$ is a displacement of the second lens group G2 to focus from an object at infinity to a close-range object at the maximum telephoto state.

When the lower limit in the conditional equation (3.1) is breached, the focussing displacement at the maximum wide-angle state becomes larger than at the maximum telephoto state. That is, the focussing displacement when zooming from the maximum wide-angle state to the maximum telephoto state decreases, and it becomes impossible to achieve a structure for the invention such that the lateral magnification of the second lens group G2 decreases monotonically from the maximum wide-angle state to the maximum telephoto state.

On the other hand, when the upper limit in the conditional equation (3.1) is breached, the difference in focussing displacements between the maximum wide-angle state and the maximum telephoto state becomes large. This is undesirable because the refractive power of the focussing lens group is then weak, and as a result the total length of the lens system increases.

In addition, when image-stabilizing is conducted such as by driving the second lens group G2 for example in a direction orthogonal to the optical axis, because the second lens group G2 is the lens group close to the aperture diaphragm, it is possible to keep aberration fluctuations accompanying eccentric driving of the second lens group G2 small. In this case, a favorable aberration state can be achieved with the second lens group G2 alone by using at least one cemented lens in the second lens group G2.

Also, the invention according to third, fourth and fifth embodiments provides a zoom lens with a zooming ratio of at least 1.5, and including, in order from the object side to the image side, a first lens group G1 having a negative refractive power and a second lens group G2 having a positive refractive power. The second lens group G2 includes, in order from the object side, a front group G2F having a positive refractive power and a rear group G2R having a positive refractive power. When zooming from a maximum wide-angle state to a maximum telephoto state, the front group G2F and the rear group G2R move integrally, and a lateral magnification of the front group G2F at an infinite focus state is always positive and decreases monotonically.

In the third, fourth and fifth embodiments of the invention, focussing on close-range objects is performed by causing the front group G2F to move along the optical axis. In addition, it is desirable for the following conditional equation 3.2 to be satisfied:

$$1.0 < \Delta X_T/\Delta X_W < 1.5 \qquad (3.2)$$

where $\Delta X_W$ is a displacement of the front group G2F to focus from an object at infinity to a close-range object at the maximum wide-angle state, and $\Delta X_T$ is a displacement of the front group G2F to focus from an object at infinity to a close-range object at the maximum telephoto state.

It is possible to accomplish image stabilizing by causing the front group G2F of the second lens group G2 to move in a direction transverse to the optical axis. In this case, it is desirable for the front group G2F to contain at least one cemented lens.

The structure of the third, fourth and fifth embodiments can be a thin near-axis optical system comprising, in order from the object side to the image side, an object-side lens group A (first lens group G1), which does not participate in focussing; a focussing lens group F (front group G2F of the second lens group), which participates in focussing; and an image-side lens group B (lens groups from the rear group G2R of the second lens group G2 on), which does not participate in focussing.

Further, the focal length of the object-side lens group A is denoted by $f_A$, the lateral magnification of the focussing lens group at the infinite focus state is denoted by $\beta_F$, and the focussing displacement (with movement from the object side toward the image side being positive) of the focussing lens group F to focus from an object at infinity to an object at an object distance (distance between object and image) R is denoted by $\Delta X$.

Furthermore, a length of the entire lens system (the distance along the optical axis from the object-side principal point of the object-side lens group A to the image plane) is denoted by TL, and a distance along the optical axis from the object-side principal point of the object-side lens group A to the object is denoted by $D_0$.

The relationship indicated by the following equation (a.2) is established, as disclosed in Japanese Laid-Open Patent Publication No. 5-173070.

$$(D_0 - f_A)\Delta X \approx (f_A^2 \times \beta_F^2)/(\beta_F^2 - 1) \tag{a.2}$$

Differentiating the above equation (a.2) with respect to $\beta_F$, the relationship indicated by the following equation (b.2) is obtained.

$$\Delta X/d\beta_F = -2\beta_F/\{(\beta_F^2 - 1)^2(D_0 - f_A)\} \tag{b.2}$$

With a general zoom lens, $(D_0 - f_A) > 0$ in equation (b.2). In addition, with the third, fourth and fifth embodiments of invention the lateral magnification $\beta_F$ of the focussing lens group F (front group G2F) at the infinite focus state is $\beta_F > 0$ from the maximum wide-angle state to the maximum telephoto state. Accordingly, the value on the right hand side of equation (b.2) is always negative, as shown in equation (c.2) below.

$$\Delta X/d\beta_F < 0 \tag{c.2}$$

From equation (c.2), it can be seen that, when the lateral magnification $\beta_F$ of the focussing lens group F at the infinite focus state monotonically decreases from the maximum wide-angle state to the maximum telephoto state, the focussing displacement $\Delta X$ of the focussing lens group F to focus from an object at infinity to a close-range object increases monotonically from the maximum wide-angle state to the maximum telephoto state.

With the above discussion, $D_0$ is treated approximately as a constant. However, in actuality, $D_0$ changes with $\beta_F$, and consequently, when $D_0$ is a small value, there are cases where $\Delta X$ does not increase monotonically.

The shape of the focus cam is determined so that the shift of focus caused by the focus cam becomes smaller through the focussing displacement that changes monotonically (increases monotonically in the various embodiments) from the maximum wide-angle state to the maximum telephoto state overlapping with the displacement of the cam in the direction of the optical axis and the displacement in the direction of rotation, as disclosed in Japanese Laid-Open Patent Publication No. 3-235908 and Japanese Laid-Open Patent Publication No. 5-142475.

With the third, fourth and fifth embodiments of the invention, the focussing displacement increases monotonically when zooming from the maximum wide-angle state to the maximum telephoto state because of the above structure. As a result, it is possible to form a focus cam capable of MF (manual focus) with little shift of focus and it is possible to realize a zoom lens which has both high speed AF and MF with little shift of focus.

Further, it is preferable for the following conditional equation (3.2) to be satisfied to reduce a size of the whole lens system and to improve the close range aberration performance by reducing the focussing displacement:

$$1.0 < \Delta X_T/\Delta X_W < 1.5 \tag{3.2}$$

where $\Delta X_T$ is a displacement of the front group G2F to focus from an object at infinity to a close-range object at the maximum wide-angle state, and $\Delta X_W$ is a displacement of the front group G2F to focus from an object at infinity to a close-range object at the maximum telephoto state.

When the lower limit in the conditional equation (3.2) is breached, the focussing displacement at the maximum wide-angle state becomes larger than at the maximum telephoto state. That is, the focussing displacement when zooming from the maximum wide-angle state to the maximum telephoto state decreases, and it becomes impossible to achieve a structure for the invention such that the lateral magnification of the front group G2F decreases monotonically from the maximum wide-angle state to the maximum telephoto state.

On the other hand, when the upper limit in the conditional equation (3.2) is breached, the difference in focussing displacements between the maximum wide-angle state and the maximum telephoto state becomes large. This is undesirable because the refractive power of the focussing lens group is then weak, and as a result the total length of the lens system increases.

In addition, to further reduce the size of a large diameter zoom lens having a large zooming ratio and a high driving efficiency for AF, such as in the third, fourth and fifth embodiments of the invention, it is desirable to have a lens system including at least a first lens group G1 having a negative refractive power, a second lens group G2 having a positive refractive power, a third lens group G3 having a negative refractive power and a fourth lens group G4 having a positive refractive power. In other words, when the attempt is made to increase the diameter in the zoom lens in front of the negative lens group, as disclosed in Japanese Laid-Open Patent Publication No. 63-241511, in a simple structure such as one having a negative-positive two lens structure, the lens system and lens barrel tend to become larger because of the increasing size of the diaphragm diameter. By using a negative-positive-negative-positive four lens structure such as in the third, fourth and fifth embodiments of the invention, the diaphragm diameter is reduced and it is possible to form the large-diameter zoom lens compactly.

In addition, when image stabilizing is conducted such as by driving the front group G2F second lens group G2, for example, in a direction orthogonal to the optical axis, because the front group G2F is the lens group closest to the aperture diaphragm, it is possible to keep aberration fluctuations accompanying eccentric driving of the front group G2F small. In this case, a favorable aberration state can be achieved with the front group G2F alone by using at least one cemented lens in the front group G2F.

BRIEF DESCRIPTION OF THE DRAWINGS

These and other aspects and advantages of the invention will become apparent from the following detailed description of preferred embodiments when taken in conjunction with the accompanying drawings, in which:

FIG. 1 is a schematic side view of the lens structure of a zoom lens according to a first embodiment of the invention;

FIG. 2 is a schematic representation of the movement of each lens group when zooming from the maximum wide-angle state to the maximum telephoto state according to the first embodiment;

FIGS. 3(a)–3(c) are graphs that show spherical aberration, astigmatism and distortion aberration, respectively, for the infinite focus state at the maximum wide-angle state according to the first embodiment;

FIGS. 4(a)–4(c) are graphs that show spherical aberration, astigmatism and distortion aberration, respectively, for the infinite focus state at the medium focal length state according to the first embodiment;

FIGS. 7(a)–7(c) are graphs that show spherical aberration, astigmatism and distortion aberration, respectively, for the close-range focus state at the medium focal length state according to the first embodiment;

FIGS. 8(a)–8(c) are graphs that show spherical aberration, astigmatism and distortion aberration, respectively, for the close-range focus state at the maximum telephoto state according to the first embodiment;

FIGS. 9(a)–9(d) are graphs that show astigmatism and coma aberration, respectively, for the maximum wide-angle state (infinite focus state) and the maximum telephoto state (infinite focus state) prior to image stabilizing according to the first embodiment;

FIGS. 10(a)–10(d) are graphs that show astigmatism and coma aberration, respectively, for the maximum wide-angle state (infinite focus state) and the maximum telephoto state (infinite focus state) at the time of image stabilizing according to the first embodiment;

FIG. 12 is a schematic representation of the movement of each lens group when zooming from the maximum wide-angle state to the maximum telephoto state according to the second embodiment;

FIGS. 19(a)–19(d) are graphs that show astigmatism and coma aberration, respectively, for the maximum wide-angle state (infinite focus state) and the maximum telephoto state (infinite focus state) prior to image stabilizing according to the second embodiment;

FIGS. 20(a)–20(d) are graphs that show astigmatism and coma aberration, respectively, for the maximum wide-angle state (infinite focus state) and the maximum telephoto state (infinite focus state) at the time of image stabilizing according to the second embodiment;

FIGS. 24(a)–24(c) are graphs that show spherical aberration, astigmatism and distortion aberration, respectively, for the infinite focus state at the maximum telephoto state according to the third embodiment;

FIGS. 25(a)–25(c) are graphs that show spherical aberration, astigmatism and distortion aberration, respectively, for the close-range focus state at the maximum wide-angle state according to the third embodiment;

FIGS. 28(a)–28(d) are graphs that show astigmatism and coma aberration, respectively, for the maximum wide-angle state (infinite focus state) and the maximum telephoto state (infinite focus state) prior to image stabilizing according to the third embodiment;

FIGS. 29(a)–29(d) are graphs that show astigmatism and coma aberration, respectively, for the maximum wide-angle state (infinite focus state) and the maximum telephoto state (infinite focus state) at the time of image stabilizing according to the third embodiment;

FIG. 30 is a schematic side view of the lens structure of a zoom lens according to a fourth embodiment of the invention;

FIGS. 31(a)–31(c) are graphs that show spherical aberration, astigmatism and distortion aberration, for the infinite focus state at the maximum wide-angle state according to the fourth embodiment;

FIGS. 32(a)–32(c) are graphs that show spherical aberration, astigmatism for the infinite focus state at the medium focal length state according to the fourth embodiment;

FIGS. 35(a)–35(c) are graphs that show spherical aberration, astigmatism and distortion aberration, respectively, for the close-range focus state at the medium focal length state according to the fourth embodiment;

FIGS. 36(a)–36(c) are graphs that show spherical aberration, astigmatism and distortion aberration, respectively, for the close-range focus state at the maximum telephoto state according to the fourth embodiment;

DETAILED DESCRIPTION OF PREFERRED EMBODIMENTS

Figure 5A:
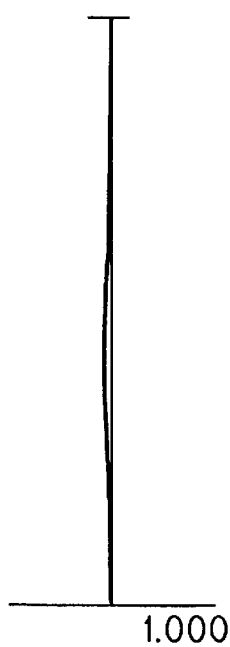
FIGS. 5(a)–5(c) are graphs that show spherical aberration, astigmatism and distortion aberration, respectively, for the infinite focus state at the maximum telephoto state according to the first embodiment.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate identical elements.

In each of the embodiments, the aspherical surfaces are expressed by the following equation (d):

$$S(y)=(y^2/R)/[1+(1-\kappa \cdot y^2/R^2)^{1/2}]+C_2 \cdot y^2+C_4 \cdot y^4+C_6 \cdot y^6+C_8 \cdot y^8+C_{10} \cdot y^{10}+ \tag{d}$$

where y denotes the height in a direction perpendicular to the optical axis of the lens system, S(y) denotes displacement (sag amount) in a direction of the optical axis at height y, R denotes a reference radius of curvature, κ denotes a conical coefficient, and Cn denotes the aspherical surface coefficient of nth degree. In each embodiment, the aspherical surfaces are marked with a * to the right side of the surface number.

FIG. 1 is a schematic side view of the lens structure of a zoom lens according to a first embodiment of the invention. FIG. 2 is a schematic representation of the movement of each lens group when zooming from the maximum wide-angle state to the maximum telephoto state according to the first embodiment.

The zoom lens of FIG. 1 includes, in order from the object side to the image side, a first lens group G1 having negative refractive power, a second lens group G2 having positive refractive power, a third lens group G3 having positive refractive power, a fourth lens group G4 having negative refractive power and a fifth lens group G5 having positive refractive power. The zoom lens of the first embodiment is a large-diameter zoom lens having a focal length of 28.9 to 77.5 mm and a large zooming ratio with an F number of 2.9, and close-range is set at 0.6 m.

The first lens group G1 includes, in order from the object side, a negative meniscus lens with a convex surface facing the object side, a biconcave lens and a positive meniscus lens with a convex surface facing the object side. The second lens group G2 includes, in order from the object side, a positive cemented lens formed of a negative meniscus lens with a convex surface facing the object side, a biconvex lens and a negative meniscus lens with a concave surface facing the object side.

The third lens group G3 includes, in order from the object side, a positive meniscus lens with a convex surface facing the object side, and a biconvex lens. The fourth lens group G4 includes, in order from the object side, a negative cemented lens formed of a positive meniscus lens with a concave surface facing the object side and a biconcave lens, and a negative cemented lens formed of a biconcave lens and a positive meniscus lens with a convex surface facing the object side.

The fifth lens group G5 includes, in order from the object side, a positive cemented lens formed of a negative meniscus lens with a convex surface facing the object side and a biconvex lens, a biconvex lens, and a negative meniscus lens with a concave surface facing the object side. The aperture diaphragm S is positioned between the third lens group G3 and the fourth lens group G4.

FIG. 1 shows the positional relationship of each of the lens groups at the maximum wide-angle state, and the lens groups move on the optical axis of the lens system along the zoom loci indicated by the arrows in FIG. 2 during zooming to the maximum telephoto state. That is, when zooming from the maximum wide-angle state to the maximum telephoto state, the second lens group G2 moves along a locus which is convex toward the object side and the third lens group G3 moves along a substantially linear locus, as shown in FIG. 2.

In addition, focussing on close-range objects is accomplished by moving the second lens group G2 toward the image side along the optical axis. Further, fluctuations in the image position that are caused by camera shaking are corrected by causing the second lens group G2 to move in a direction orthogonal to the optical axis.

The values of various dimensions of the first embodiment of the invention are listed below and in Table 1 below. In the ensuing data, f denotes focal length, FNO denotes F-number, 2ω denotes the field angle, Bf denotes back focus, β denotes photographic magnification and d0 denotes a distance along the optical axis between the object and a surface closest to the object side. The surface number indicates an order of the lens surfaces from the object side along a direction in which the light rays move, and the refractive indices and Abbe numbers are values corresponding to a d-line (λ=587.6 nm).

TABLE 1 f = 28.9~77.5
FNO = 2.9
2ω = 76.0~30.7

| Surface Number | Radius of Curvature | Intersurface Distance | Abbe Number | Refractive Index |
|---|---|---|---|---|
| 1 | 79.821 | 2.30 | 65.42 | 1.60300 |
| 2 | 38.043 | 12.00 | | |
| 3 | −231.495 | 2.00 | 58.50 | 1.65160 |
| 4* | 40.839 | 1.00 | | |
| 5 | 47.012 | 4.40 | 23.01 | 1.86074 |
| 6 | 73.319 | (d6 = variable) | | |
| 7 | 65.035 | 1.60 | 23.01 | 1.86074 |
| 8 | 38.333 | 8.60 | 64.10 | 1.51680 |
| 9 | −70.833 | 1.60 | 25.50 | 1.80458 |
| 10 | −93.025 | (d10 = variable) | | |
| 11 | 86.878 | 3.60 | 60.14 | 1.62041 |
| 12 | 248.983 | 0.10 | | |
| 13 | 56.519 | 6.00 | 55.60 | 1.69680 |
| 14 | −9584.425 | (d14 = variable) | | |
| 15 | −59.348 | 2.20 | 35.72 | 1.90265 |
| 16 | −47.283 | 1.40 | 64.10 | 1.51680 |
| 17* | 97.556 | 2.50 | | |
| 18 | −85.325 | 1.40 | 82.52 | 1.49782 |
| 19 | 35.214 | 2.60 | 25.50 | 1.80458 |
| 20 | 127.209 | (d20 = variable) | | |
| 21 | 559.371 | 1.40 | 23.01 | 1.86074 |
| 22 | 40.585 | 7.30 | 82.52 | 1.49782 |
| 23 | −45.943 | 0.10 | | |
| 24 | 61.510 | 7.00 | 57.53 | 1.67025 |
| 25 | −88.316 | 5.20 | | |
| 26 | −32.632 | 2.00 | 39.61 | 1.80454 |
| 27 | −49.129 | (Bf = variable) | | |

Aspherical Surface Data:

Surface 4:

| K | $C_2$ | $C_4$ |
|---|---|---|
| −0.0842 | 0.0000 | $7.1296 \times 10^{-8}$ |
| $C_6$ | $C_8$ | $C_{10}$ |
| $-3.0702 \times 10^{-10}$ | $5.0743 \times 10^{-13}$ | $-1.5016 \times 10^{-16}$ |

Surface 17:

| K | $C_2$ | $C_4$ |
|---|---|---|
| −3.9460 | 0.0000 | $-3.5252 \times 10^{-6}$ |
| $C_6$ | $C_8$ | $C_{10}$ |
| $9.6494 \times 10^{-9}$ | $-7.6024 \times 10^{-11}$ | $1.7602 \times 10^{-13}$ |

Variable Distance for Zooming:

| f/β | 28.9 | 43.0 | 77.5 | −0.0630 | −0.0917 | −0.1672 |
|---|---|---|---|---|---|---|
| d0 | ∞ | ∞ | ∞ | 402.423 | 417.763 | 418.380 |
| d6 | 53.167 | 25.058 | 2.215 | 57.865 | 29.985 | 8.081 |
| d10 | 7.339 | 10.448 | 7.339 | 2.641 | 5.521 | 1.473 |
| d14 | 5.227 | 13.372 | 33.887 | 5.227 | 13.372 | 33.887 |
| d20 | 15.835 | 11.083 | 3.033 | 15.835 | 11.083 | 3.033 |
| Bf | 39.709 | 45.976 | 58.847 | 39.709 | 45.976 | 58.847 |

Values Corresponding to Conditions:

$\Delta X_T / \Delta X_W = 1.25$

| | Maximum Wide-Angle State | Intermediate | Maximum Telephoto State |
|---|---|---|---|
| ΔX | 4.70 | 4.93 | 5.87 |
| $\beta_F$ | 28.74 | 3.55 | 2.07 |

As is shown in the "Values Corresponding to Conditions" section above, from the maximum wide-angle state to the maximum telephoto state, the lateral magnification $\beta_F$ of the second lens group G2 at an infinite focus state decreases monotonically and the focussing displacement ΔX of the second lens group G2 increases monotonically. Further, $\beta_F$ is a lateral magnification of the second lens group G2, which is the focussing lens group, at the infinite focus state, and ΔX is a focussing displacement (with movement toward the object being positive) of the second lens group G2 to focus from an object at infinity to a close-range object.

Table 2 below shows the spline sample data when the shape of the focus cam in the first embodiment is expressed by a spline function (conforming to "Numerical Analysis and FORTRAN" published by Maruzen Co. and "Spline Functions and Their Applications" published by Kyoiku Shuppan) relating to the displacement in the rotational direction (ANGLE) and the displacement in the direction of the optical axis (DIS). That is, Table 2 shows the displacement in the direction of the optical axis (DIS) and the displacement in the rotational direction (ANGLE) at the spline interpolation sample point. The displacement in the direction of the optical axis (DIS) assumes movement toward the object to be positive.

TABLE 2

| | ANGLE | DIS |
|---|---|---|
| 1 | 0.000 | 0.000 |
| 2 | 9.019 | −0.800 |
| 3 | 13.664 | −1.200 |
| 4 | 18.426 | −1.588 |
| 5 | 28.278 | −2.514 |
| 6 | 41.651 | −3.850 |
| 7 | 50.000 | −4.710 |
| 8 | 59.019 | −5.686 |
| 9 | 63.664 | −6.205 |
| 10 | 68.426 | −6.748 |
| 11 | 78.278 | −7.909 |
| 12 | 91.651 | −9.571 |
| 13 | 100.000 | −10.590 |

Table 3 below shows the infinite focus position (position corresponding to infinity) of the focus cam of the first embodiment for each focal length state, and the rotational displacement (rotation amount for focussing) of the focus cam for each object distance. In Table 3, the zooming rotation amounts from the maximum wide-angle state (f=28.9) to the maximum telephoto state (f=77.5) have been normalized to 50. At this time, the rotation amount for focussing from the infinite focus position (object distance R=∞) to the close focus position (R=0.6) is 50.

TABLE 3

| Focal length | Position Corresponding to Infinity | Object Distance | Focus Rotation Amount For Focussing |
|---|---|---|---|
| 28.9 mm | 0.000 | 3 m | 9.019 |
| 35.0 mm | 5.400 | 2 m | 13.664 |
| 43.0 mm | 13.000 | 1.5 m | 18.426 |
| 50.0 mm | 20.000 | 1.0 m | 28.278 |
| 60.0 mm | 31.350 | 0.7 m | 41.651 |
| 68.0 mm | 40.250 | 0.6 m | 50.000 |
| 77.5 mm | 50.000 | | |

Next, the question of whether MF (manual focus) is possible in the zoom lens of the first embodiment will be considered. When the displacement of the image plane (imaging point) from a predetermined imaging point position exceeds the focussing depth of the zoom lens, manual focussing (MF) using a helicoid (helix-shaped screw) becomes impossible. Table 4 below shows the displacement of the imaging point (image plane) when an MF operation is undertaken using the focus cam of the first embodiment, in correspondence with each focus length state and each object distance state.

TABLE 4

|  | 0.6 m | 0.7 m | 1.0 m | 1.5 m | 2 m | 3 m |
|---|---|---|---|---|---|---|
| 28.9 mm | 0.000 | 0.0006 | 0.000 | 0.000 | −0.015 | −0.018 |
| 35.0 mm | −0.037 | −0.009 | −0.009 | 0.012 | 0.013 | −0.005 |
| 43.0 mm | −0.038 | 0.013 | 0.008 | 0.018 | 0.031 | 0.041 |
| 50.0 mm | −0.059 | 0.002 | −0.005 | −0.018 | −0.016 | −0.010 |
| 60.0 mm | −0.037 | 0.059 | 0.043 | 0.030 | 0.018 | 0.004 |
| 68.0 mm | −0.061 | 0.057 | 0.052 | 0.042 | 0.038 | 0.027 |
| 77.5 mm | 0.000 | 0.000 | 0.000 | 0.000 | 0.000 | 0.000 |

As is clear from Table 4, the displacement of the imaging point at each focal length state and each object distance state is sufficiently small with respect to the focal depth (0.09 mm) of the lens system of the first embodiment, so that accurate manual focussing is possible with little shift of focus.

FIG. 3(a) through FIG. 8(c) are graphs that show spherical aberration, astigmatism and distortion aberration, respectively, for d-line (λ=587.6 nm) in the first embodiment.

Figure 5B:
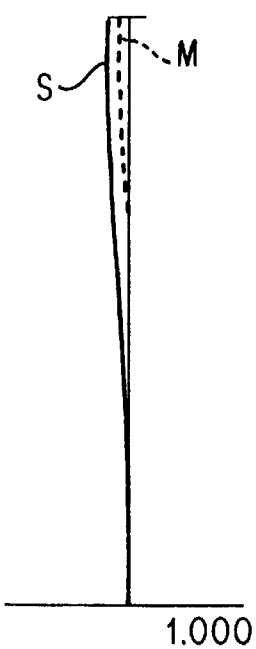
Figure 5C:
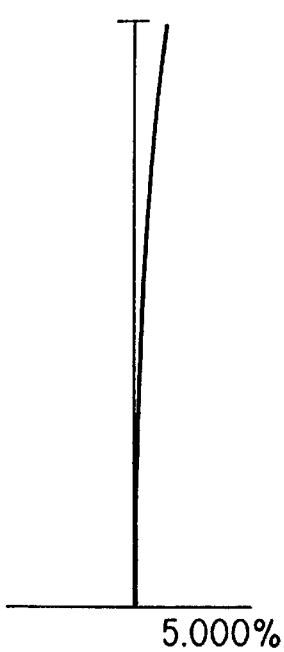

FIGS. 3(a)–3(c) are graphs that show spherical aberration, astigmatism and distortion aberration, respectively, for the infinite focus state at the maximum wide-angle state. FIGS. 4(a)–4(c) are graphs that show spherical aberration, astigmatism and distortion aberration, respectively, for the infinite focus state at the medium focal length state. FIGS. 5(a)–5(c) are graphs that show spherical aberration, astigmatism and distortion aberration, respectively, for the infinite focus state at the maximum telephoto state.

Figure 6A:
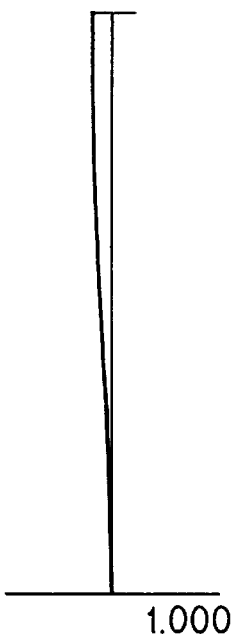
FIGS. 6(a)–6(c) are graphs that show spherical aberration, astigmatism and distortion aberration, respectively, for the close-range focus state at the maximum wide-angle state according to the first embodiment.
Figure 6B:
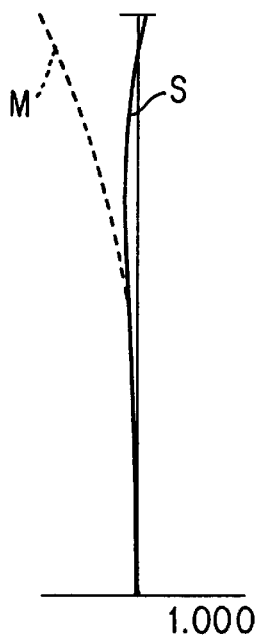
Figure 6C:
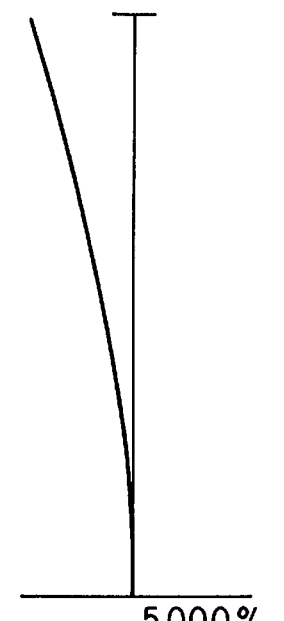

FIGS. 6(a)–6(c) are graphs that show spherical aberration, astigmatism and distortion aberration, respectively, for the close-range focus state at the maximum wide-angle state. FIGS. 7(a)–7(c) are graphs that show spherical aberration, astigmatism and distortion aberration, respectively, for the close-range focus state at the medium focal length state. FIGS. 8(a)–8(c) are graphs that show spherical aberration, astigmatism and distortion aberration, respectively, for the close-range focus state at the maximum telephoto state.

FIGS. 9(a)–9(d) are graphs that show astigmatism and coma aberration, respectively, for the maximum wide-angle state (infinite focus state) and the maximum telephoto state (infinite focus state) prior to image stabilizing according to the first embodiment. FIGS. 10(a)–10(d) are graphs that show astigmatism and coma aberration, respectively, for the maximum wide-angle state (infinite focus state) and the maximum telephoto state (infinite focus state) at the time of image stabilizing according to the first embodiment. In FIGS. 10(a)–10(d), the various aberrations amounts are shown for the case wherein the second lens group G2 is off-center by an amount corresponding to a field angle of 0.2°.

In each aberration graph, FNO denotes F-number, NA denotes numerical aperture and Y denotes image height. Further, in the aberration showing astigmatism, the solid line represents sagittal image plane while the broken line represents meridional image plane. In the aberration graphs describing spherical surface aberration, the broken line represents the sine condition.

As the aberration graphs in FIG. 3(a) through FIG. 8(c) clearly show, with the first embodiment the various aberrations are favorably corrected at each object distance state from the maximum wide-angle state to the maximum telephoto state. As the aberration graphs in FIG. 9 and FIG. 10 clearly show, with the first embodiment the aberration fluctuations are smaller at the time of image stabilizing compared to prior to image stabilizing, and image stabilizing is possible because favorable imaging performance is maintained.

Figure 11:
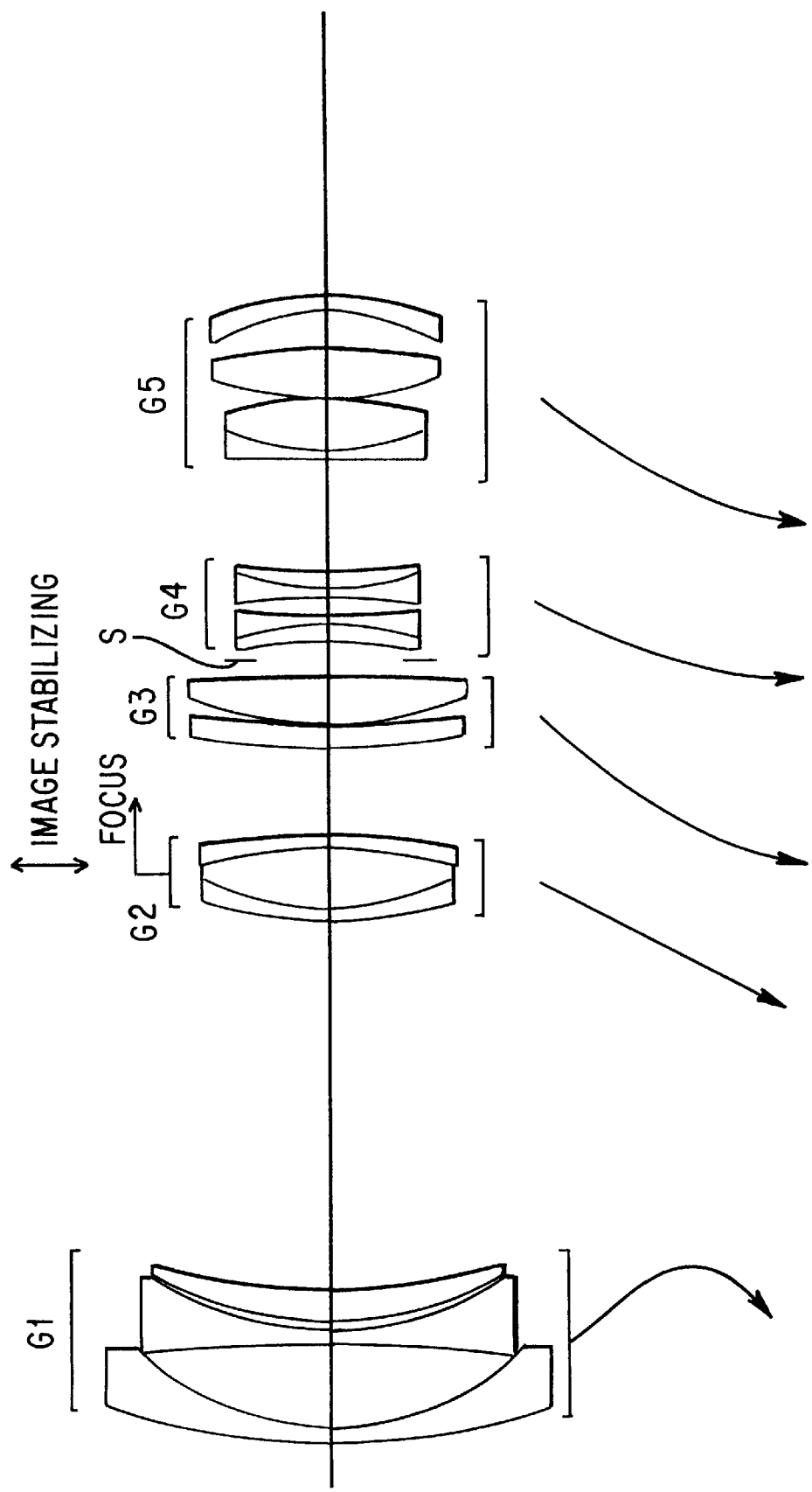
FIG. 11 is a schematic side view of the lens structure of a zoom lens according to a second embodiment of the invention.

FIG. 11 is a schematic side view of the lens structure of a zoom lens according to a second embodiment of the invention. FIG. 12 is a schematic representation of the movement of each lens group when zooming from the maximum wide-angle state to the maximum telephoto state according to the second embodiment.

The zoom lens of FIG. 11 includes, in order from the object side to the image side, a first lens group G1 having negative refractive power, a second lens group G2 having positive refractive power, a third lens group G3 having positive refractive power, a fourth lens group G4 having negative refractive power and a fifth lens group G5 having positive refractive power. The zoom lens of the second embodiment is a large-diameter zoom lens having a focal length of 28.9 to 77.5 mm and a large zooming ratio with an F number of 2.9, and close-range is set at 0.6 m.

The first lens group G1 includes, in order from the object side, a negative meniscus lens with a convex surface facing the object side, a biconcave lens and a positive meniscus lens with a convex surface facing the object side. The second lens group G2 includes, in order from the object side, a positive cemented lens formed of a negative meniscus lens with a convex surface facing the object side, a biconvex lens and a negative meniscus lens with a concave surface facing the object side.

The third lens group G3 includes, in order from the object side, a positive meniscus lens with a convex surface facing the object side, and a biconvex lens. The fourth lens group G4 includes, in order from the object side, a negative cemented lens formed of a positive meniscus lens with a concave surface facing the object side and a biconcave lens, and a negative cemented lens formed of a biconcave lens and a positive meniscus lens with a convex surface facing the object side.

The fifth lens group G5 includes, in order from the object side, a positive cemented lens formed of a negative meniscus with a convex surface facing the object side and a biconvex lens, a biconvex lens, and a negative meniscus lens with a concave surface facing the object side. The aperture diaphragm S is positioned between the third lens group G3 and the fourth lens group G4.

FIG. 11 shows the positional relationship of each of the lens groups at the maximum wide-angle state, and the lens groups move on the optical axis of the lens system along the zoom loci indicated by the arrows in FIG. 12 during zooming to the maximum telephoto state. That is, when zooming from the maximum wide-angle state to the maximum telephoto state, the second lens group G2 moves along a substantially linear locus and the third lens group G3 moves along a locus which is convex toward the object side, as shown in FIG. 12.

In addition, focussing on close-range objects is effected by moving the second lens group G2 toward the image side along the optical axis. Further, fluctuations in the image position that are caused by camera shaking are corrected by causing the second lens group G2 to move in a direction orthogonal to the optical axis.

The values of various dimensions of the second embodiment of the invention are listed in Table 5 below. In the ensuing data, f denotes focal length, FNO denotes F-number, 2ω denotes the field angle, Bf denotes back focus, β denotes photographic magnification and do denotes a distance along the optical axis between the object and a surface closest to the object side. The surface number indicates an order of the lens surfaces from the object side along a direction in which the light rays move, and the refractive indices and Abbe numbers are values corresponding to a d-line ($\lambda$=587.6 nm).

TABLE 5 f = 28.9~77.5
FNO = 2.9
2ω = 75.6~30.7

| Surface Number | Radius of Curvature | Intersurface Distance | Abbe Number | Refractive Index |
|---|---|---|---|---|
| 1 | 91.747 | 2.30 | 65.42 | 1.60300 |
| 2 | 37.527 | 12.00 | | |
| 3 | −224.843 | 2.00 | 58.50 | 1.65160 |
| 4* | 41.321 | 1.00 | | |
| 5 | 47.809 | 4.40 | 23.01 | 1.86074 |
| 6 | 83.643 | (d6 = variable) | | |
| 7 | 63.547 | 1.60 | 23.01 | 1.86074 |
| 8 | 36.989 | 8.60 | 64.10 | 1.51680 |
| 9 | −66.654 | 1.60 | 25.50 | 1.80458 |
| 10 | −90.269 | (d10 = variable) | | |
| 11 | 109.630 | 3.60 | 60.14 | 1.62041 |
| 12 | 346.358 | 0.10 | | |
| 13 | 54.788 | 6.00 | 55.60 | 1.69680 |
| 14 | −1471.913 | (d14 = variable) | | |
| 15 | −62.686 | 2.20 | 35.72 | 1.90265 |
| 16 | −48.003 | 1.40 | 64.10 | 1.51680 |
| 17* | 88.520 | 2.50 | | |
| 18 | −78.612 | 1.40 | 82.52 | 1.49782 |
| 19 | 33.201 | 2.60 | 25.50 | 1.80458 |
| 20 | 123.900 | (d20 = variable) | | |
| 21 | 413.396 | 1.40 | 23.01 | 1.86074 |
| 22 | 37.162 | 7.30 | 82.52 | 1.49782 |
| 23 | −50.367 | 0.10 | | |
| 24 | 63.743 | 7.00 | 57.53 | 1.67025 |
| 25 | −70.907 | 5.20 | | |
| 26 | −33.164 | 2.00 | 39.61 | 1.80454 |
| 27 | −51.045 | (Bf = variable) | | |

Aspherical Surface Data:

Surface 4:

| K | $C_2$ | $C_4$ |
|---|---|---|
| −0.0842 | 0.0000 | $4.7358 \times 10^{-8}$ |
| $-4.6171 \times 10^{-10}$ | $7.2146 \times 10^{-13}$ | $-2.0611 \times 10^{-16}$ |

Surface 17:

| K | $C_2$ | $C_4$ |
|---|---|---|
| −3.9460 | 0.0000 | $-2.9044 \times 10^{-6}$ |
| $1.1660 \times 10^{-8}$ | $-8.3609 \times 10^{-11}$ | $1.9060 \times 10^{-13}$ |

Variable Distance for Zooming:

| f/β | 28.9 | 43.0 | 77.5 | −0.0637 | −0.0916 | −0.1672 |
|---|---|---|---|---|---|---|
| d0 | ∞ | ∞ | ∞ | 398.916 | 419.501 | 419.419 |
| d6 | 51.820 | 24.270 | 1.164 | 56.566 | 29.183 | 7.031 |
| d10 | 12.167 | 9.167 | 7.058 | 7.421 | 4.254 | 1.192 |
| d14 | 5.392 | 13.537 | 34.052 | 5.392 | 13.537 | 34.052 |
| d20 | 15.160 | 11.010 | 2.760 | 15.160 | 11.010 | 2.760 |
| Bf | 40.245 | 46.214 | 59.246 | 40.245 | 46.214 | 59.246 |

Values Corresponding to Conditions:

$\Delta X_T / \Delta X_W = 1.24$

| | Maximum Wide-Angle State | Intermediate | Maximum Telephoto State |
|---|---|---|---|
| $\Delta X$ | 4.75 | 4.91 | 5.87 |
| $\beta_F$ | 26.74 | 3.58 | 2.07 |

As is shown in the "Values Corresponding to Conditions" section above, from the maximum wide-angle state to the maximum telephoto state, the lateral magnification $\beta_F$ of the second lens group G2 at an infinite focus state decreases monotonically and the focussing displacement $\Delta X$ of the second lens group G2 increases monotonically. Further, $\beta_F$ is the lateral magnification of the second lens group G2, which is the focussing lens group, at the infinite focus state, and $\Delta X$ is the focussing displacement (with movement toward the object being positive) of the second lens group G2 in order to focus from an object at infinity to a close-range object.

Table 6 below shows the spline sample data when the shape of the focus cam in the second embodiment is expressed by a spline function (conforming to "Numerical Analysis and FORTRAN" by Maruzen Co. and "Spline Functions and Their Applications" by Kyoiku Shuppan) relating to the displacement in the rotational direction (ANGLE) and the displacement in the direction of the optical axis (DIS). That is, Table 6 shows the displacement in the direction of the optical axis (DIS) and the displacement in the rotational direction (ANGLE) at the spline interpolation sample point. The displacement in the direction of the optical axis (DIS) assumes movement toward the object to be positive.

TABLE 6

| | ANGLE | DIS |
|---|---|---|
| 1 | 0.000 | 0.000 |
| 2 | 9.238 | −0.800 |
| 3 | 13.937 | −1.180 |
| 4 | 18.639 | −1.570 |
| 5 | 28.639 | −2.528 |
| 6 | 42.130 | −3.900 |
| 7 | 50.130 | −4.758 |
| 8 | 59.238 | −5.734 |
| 9 | 63.937 | −6.253 |
| 10 | 68.730 | −6.796 |
| 11 | 78.639 | −7.957 |
| 12 | 92.130 | −9.620 |
| 13 | 100.130 | −10.638 |

Table 7 below shows the infinite focus position (position corresponding to infinity) of the focus cam of the second embodiment for each focal length state, and the rotational displacement (rotation amount for focussing) of the focus cam for each object distance. In Table 7, the zooming rotation amounts from the maximum wide-angle state (f=28.9) to the maximum telephoto state (f=77.5) have been normalized to 50. At this time, the rotation amount for focussing from the infinite focus position (object distance R=∞) to the close focus position (R=0.6) is 50.021.

TABLE 7

| Focal length | Position Corresponding to Infinity | Object Distance | Focus Rotation Amount For Focussing |
|---|---|---|---|
| 28.9 mm | 0.000 | 3 m | 9.109 |
| 35.0 mm | 4.250 | 2 m | 13.812 |
| 43.0 mm | 10.500 | 1.5 m | 18.608 |
| 50.0 mm | 16.500 | 1.0 m | 28.522 |
| 60.0 mm | 27.000 | 0.7 m | 42.019 |
| 68.0 mm | 36.500 | 0.6 m | 50.021 |
| 77.5 mm | 50.000 | | |

Next, the question of whether MF (manual focus) is possible in the zoom lens of the second embodiment will be considered. When the displacement of the image plane (imaging point) from a predetermined imaging point position exceeds the focussing depth of the zoom lens, manual focussing (MF) using a helicoid (helix-shaped screw) becomes impossible. Table 8 below shows the displacement of the imaging point (image plane) when an MF operation is undertaken using the focus cam of the second embodiment, in correspondence with each focus length state and each object distance state.

TABLE 8

|  | 0.6 m | 0.7 m | 1.0 m | 1.5 m | 2 m | 3 m |
| --- | --- | --- | --- | --- | --- | --- |
| 28.9 mm | 0.005 | 0.005 | 0.005 | 0.013 | −0.002 | −0.013 |
| 35.0 mm | −0.035 | −0.026 | −0.004 | 0.026 | 0.028 | 0.008 |
| 43.0 mm | −0.037 | −0.034 | 0.001 | 0.023 | 0.046 | 0.055 |
| 50.0 mm | −0.055 | −0.048 | −0.042 | −0.021 | −0.011 | −0.012 |
| 60.0 mm | −0.023 | −0.012 | −0.046 | −0.046 | −0.030 | −0.025 |
| 68.0 mm | 0.021 | 0.035 | 0.006 | −0.034 | −0.047 | −0.029 |
| 77.5 mm | 0.000 | 0.000 | 0.000 | 0.000 | 0.000 | 0.000 |

As is clear from Table 8, the displacement of the imaging point at each focal length state and each object distance state is sufficiently small with respect to the focal depth (0.09 mm) of the lens system of the second embodiment, so that accurate manual focussing is possible with little shift of focus.

FIG. 13(a) through FIG. 18(c) are graphs that show spherical aberration, astigmatism and distortion aberration, respectively, for d-line (λ=587.6 nm) in the second embodiment.

Figure 13A:
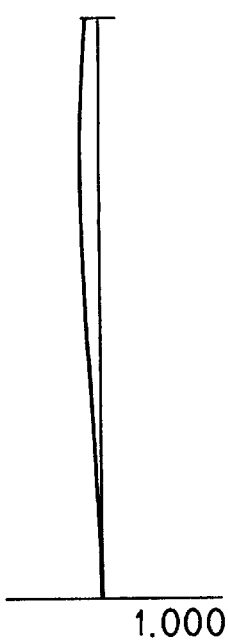
FIGS. 13(a)–13(c) are graphs that show spherical aberration, astigmatism and distortion aberration, respectively, for the infinite focus state at the maximum wide-angle state according to the second embodiment.
Figure 13B:
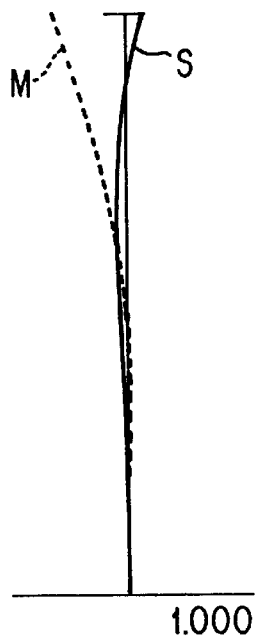
Figure 13C:
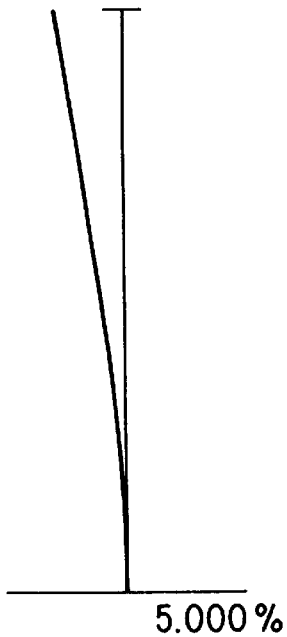
Figure 14A:
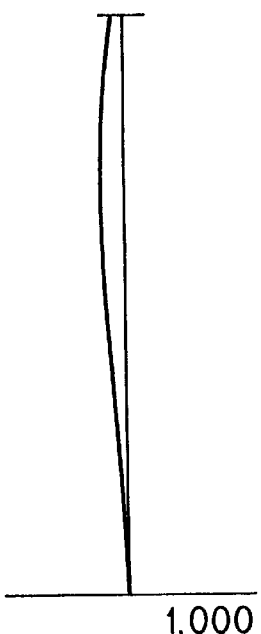
FIGS. 14(a)–14(c) are graphs that show spherical aberration, astigmatism and distortion aberration, respectively, for the infinite focus state at the medium focal length state according to the second embodiment.
Figure 14B:
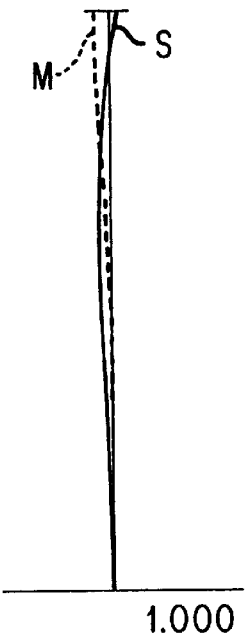
Figure 14C:
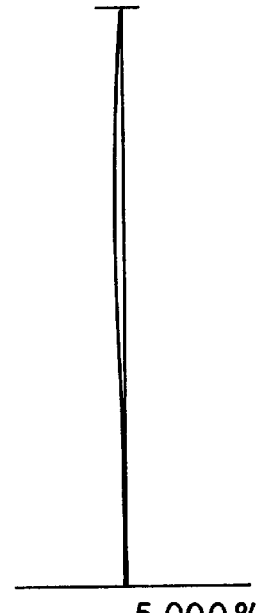
Figure 15A:
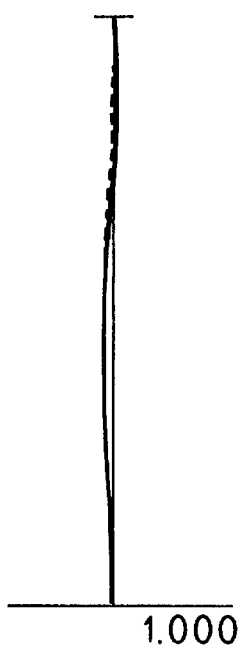
FIGS. 15(a)–15(c) are graphs that show spherical aberration, astigmatism and distortion aberration, respectively, for the infinite focus state at the maximum telephoto state according to the second embodiment.
Figure 15B:
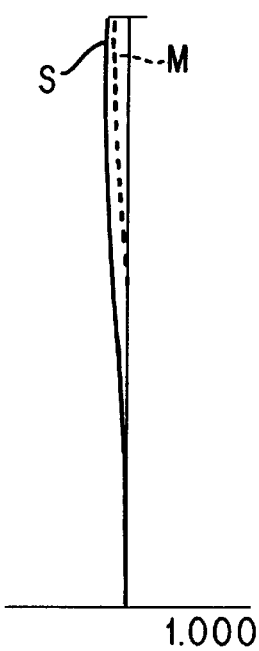
Figure 15C:
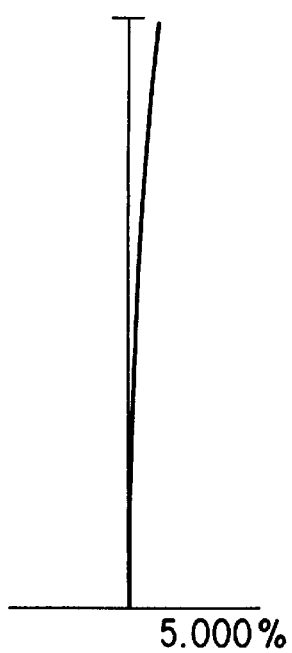

FIGS. 13(a)–13(c) are graphs that show spherical aberration, astigmatism and distortion aberration, respectively, for the infinite focus state at the maximum wide-angle state. FIGS. 14(a)–14(c) are graphs that show spherical aberration, astigmatism and distortion aberration, respectively, for the infinite focus state at the medium focal length state. FIGS. 15(a)–15(c) are graphs that show spherical aberration, astigmatism and distortion aberration, respectively, for the infinite focus state at the maximum telephoto state.

Figure 16A:
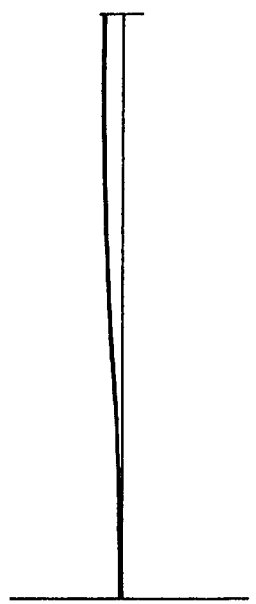
FIGS. 16(a)–16(c) are graphs that show spherical aberration, astigmatism and distortion aberration, respectively, for the close-range focus state at the maximum wide-angle state according to the second embodiment.
Figure 16B:
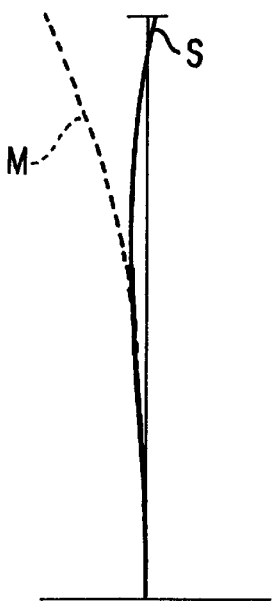
Figure 16C:
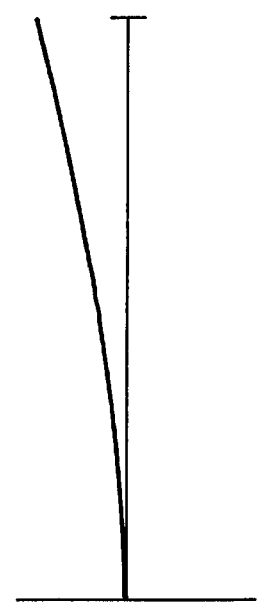
Figure 17A:
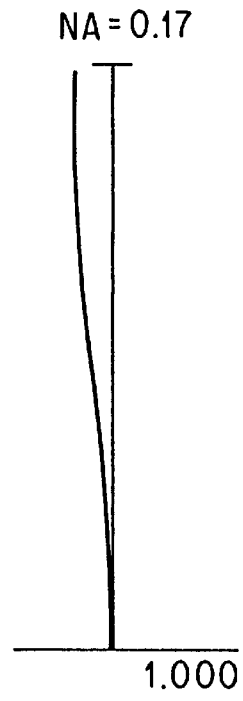
FIGS. 17(a)–17(c) are graphs that show spherical aberration, astigmatism and distortion aberration, respectively, for the close-range focus state at the medium focal length state according to the second embodiment.
Figure 17B:
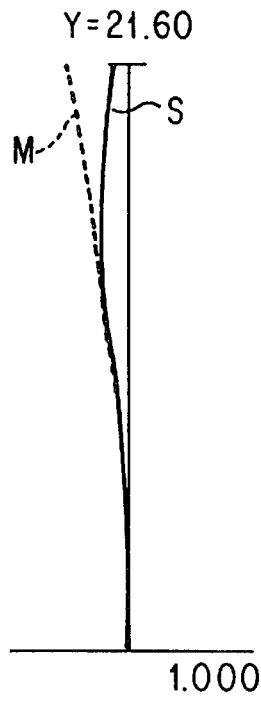
Figure 17C:
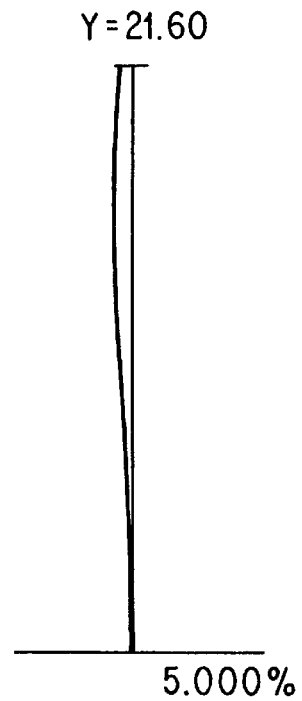
Figure 18A:
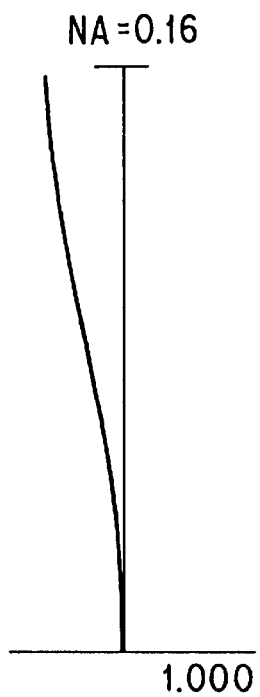
FIGS. 18(a)–18(c) are graphs that show spherical aberration, astigmatism and distortion aberration, respectively, for the close-range focus state at the maximum telephoto state according to the second embodiment.
Figure 18B:
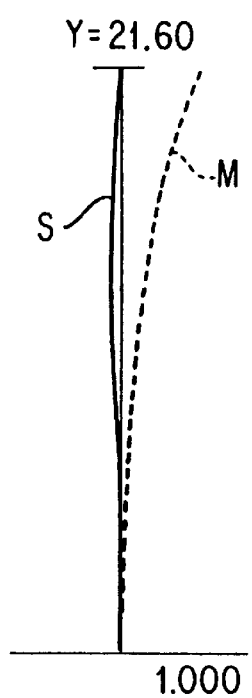
Figure 18C:
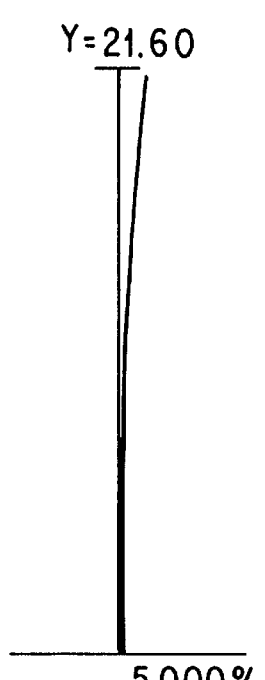

FIGS. 16(a)–16(c) are graphs that show spherical aberration, astigmatism and distortion aberration, respectively, for the close-range focus state at the maximum wide-angle state. FIGS. 17(a)–17(c) are graphs that show spherical aberration, astigmatism and distortion aberration, respectively, for the close-range focus state at the medium focal length state. FIGS. 18(a)–18(c) are graphs that show spherical aberration, astigmatism and distortion aberration, respectively, for the close-range focus state at the maximum telephoto state.

FIGS. 19(a)–19(d) are graphs that show astigmatism and coma aberration, respectively, for the maximum wide-angle state (infinite focus state) and the maximum telephoto state (infinite focus state) prior to image stabilizing according to the second embodiment. FIGS. 20(a)–20(d) are graphs that show astigmatism and coma aberration, respectively, for the maximum wide-angle state (infinite focus state) and the maximum telephoto state (infinite focus state) at the time of image stabilizing according to the second embodiment. In FIGS. 20(a)–29(d), the various aberrations amounts are shown for the case wherein the second lens group G2 is off-center by an amount corresponding to a field angle of 0.2°.

In each aberration graph, FNO denotes F-number, NA denotes numerical aperture and Y denotes image height. Further, in the aberration graphs showing astigmatism, the solid line represents sagittal image plane while the broken line represents meridional image plane. In the aberration graphs describing spherical surface aberration, the broken lines represent sine condition.

As the aberration graphs in FIG. 13(a) through FIG. 18(c) clearly show, with the second embodiment the various aberrations are favorably corrected at each object distance state from the maximum wide-angle state to the maximum telephoto state. As the aberration graphs in FIGS. 19(a)–19(d) and FIGS. 20(a)–20(d) clearly show, with the second embodiment the aberration fluctuations are smaller at the time of image stabilizing compared to prior to image stabilizing, and image stabilizing is possible because favorable imaging performance is maintained.

Figure 21:
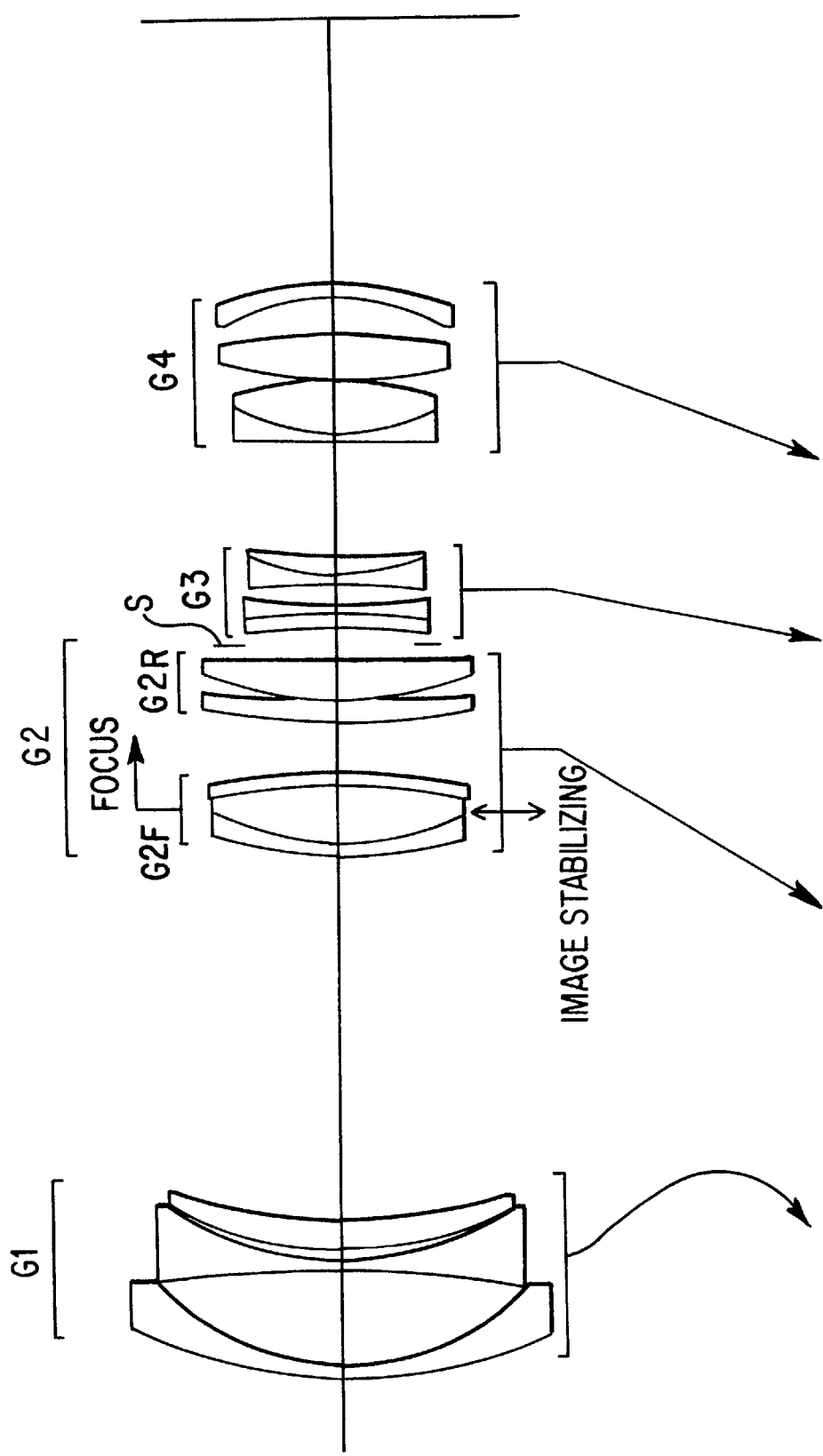
FIG. 21 is a schematic side view of the lens structure of a zoom lens according to a third embodiment of the invention.

FIG. 21 is a schematic side view of the lens structure of a zoom lens according to a third embodiment of the invention.

The zoom lens of FIG. 1 includes, in the order from the object side to the image side: a first lens group G1 having negative refractive power, a second lens group G2 having positive refractive power, a third lens group G3 having negative refractive power and a fourth lens group G4 having positive refractive power.

The zoom lens of the third embodiment is a large-diameter zoom lens having a focal length of 28.9 to 77.5 mm and a large zooming ratio with an F number of 2.9, and close-range is set at 0.6 m.

The first lens group G1 includes, in order from the object side, a negative meniscus lens with a convex surface facing the object side, a biconcave lens and a positive meniscus lens with a convex surface facing the object side. The second lens group G2 includes, in order from the object side, a front group G2F with a positive cemented lens formed of a negative meniscus lens with a convex surface facing the object side, a biconvex lens and a negative meniscus lens with a concave surface facing the object side, and a rear group G2R formed of a positive meniscus lens with a convex surface facing the object side, and a biconvex lens.

The third lens group G3 includes, in order from the object side, a negative cemented lens formed of a positive meniscus lens with a concave surface facing the object side and a biconcave lens, and a negative cemented lens formed of a biconcave lens and a positive meniscus lens with a convex surface facing the object side. The fourth lens group G4 includes, in order from the object side, a positive cemented lens formed of a negative meniscus with a convex surface facing the object side and a biconvex lens, a biconvex lens, and a negative meniscus lens with a concave surface facing the object side. The aperture diaphragm S is positioned between the second lens group G2 and the third lens group G3.

FIG. 1 shows the positional relationship of each of the lens groups at the maximum wide-angle state, and the lens groups move on the optical axis along the zoom loci indicated by the arrows in FIG. 1 during zooming to the maximum telephoto state. The front group G2F and the rear group G2R of the second lens group G2 move integrally when zooming from the maximum wide-angle state to the maximum telephoto state.

In addition, focussing on close-range objects is accomplished by moving the front group G2F of the second lens group G2 toward the image side along the optical axis. Further, fluctuations in the image position that are caused by camera shaking are corrected by causing the front group G2F of the second lens group G2 to move in a direction orthogonal to the optical axis.

The values of various dimensions of the third embodiment of the invention are listed in Table 9 below. In the ensuing data, f denotes focal length, FNO denotes F-number, 2ω denotes the field angle, Bf denotes back focus, β denotes photographic magnification and do denotes a distance along the optical axis between the object and a surface closest to the object side. The surface number indicates an order of the lens surfaces from the object side along a direction in which the light rays move, and the refractive indices and Abbe numbers are the values corresponding to a d-line ($\lambda$=587.6 nm).

TABLE 9 f = 28.9~77.5
FNO = 2.9
2$\omega$ = 75.7~30.6

| Surface Number | Radius of Curvature | Intersurface Distance | Abbe Number | Refractive Index |
|---|---|---|---|---|
| 1 | 72.747 | 2.30 | 65.42 | 1.60300 |
| 2 | 37.000 | 13.00 | | |
| 3 | -172.809 | 2.10 | 61.09 | 1.58913 |
| 4 | 39.894 | 1.00 | | |
| 5* | 49.820 | 4.40 | 23.01 | 1.86074 |
| 6 | 74.750 | (d6 = variable) | | |
| 7 | 63.402 | 1.60 | 23.01 | 1.86074 |
| 8 | 37.530 | 8.60 | 64.10 | 1.51680 |
| 9 | -75.887 | 1.60 | 25.50 | 1.80458 |
| 10 | -97.792 | (d10 = variable) | | |
| 11 | 96.034 | 3.60 | 60.14 | 1.62041 |
| 12 | 261.743 | 0.10 | | |
| 13 | 54.262 | 6.00 | 55.60 | 1.69680 |
| 14 | -5995.277 | (d14 = variable) | | |
| 15 | -74.414 | 2.20 | 35.72 | 1.90265 |
| 16 | -62.929 | 1.45 | 64.10 | 1.51680 |
| 17 | 121.380 | 2.50 | | |
| 18 | -85.723 | 1.40 | 82.52 | 1.49782 |
| 19* | 31.093 | 2.60 | 25.50 | 1.80458 |
| 20 | 84.7589 | (d20 = variable) | | |
| 21 | 459.690 | 1.40 | 23.01 | 1.86074 |
| 22 | 40.240 | 7.30 | 82.52 | 1.49782 |
| 23 | -49.771 | 0.10 | | |
| 24 | 62.369 | 7.00 | 57.53 | 1.67025 |
| 25 | -76.454 | 5.20 | | |
| 26 | -32.524 | 2.00 | 39.61 | 1.80454 |
| 27 | -50.194 | (Bf = variable) | | |

Aspherical Surface Data:

Surface 5:

| K | $C_2$ | $C_4$ |
|---|---|---|
| -0.0842 | 0.0000 | $-4.4790 \times 10^{-7}$ |
| $C_6$ | $C_8$ | $C_{10}$ |
| $-5.6956 \times 10^{-10}$ | $7.9321 \times 10^{-13}$ | $-2.6103 \times 10^{-16}$ |

Surface 19:

| K | $C_2$ | $C_4$ |
|---|---|---|
| -3.9460 | 0.0000 | $-3.2602 \times 10^{-6}$ |
| $C_6$ | $C_8$ | $C_{10}$ |
| $1.1210 \times 10^{-8}$ | $-8.6879 \times 10^{-11}$ | $2.0447 \times 10^{-13}$ |

Variable Distance for Zooming:

| f/$\beta$ | 28.9 | 43.0 | 77.5 | -0.0631 | -0.0913 | -0.1672 |
|---|---|---|---|---|---|---|
| d0 | $\infty$ | $\infty$ | $\infty$ | 401.441 | 419.214 | 417.398 |
| d6 | 53.142 | 25.814 | 2.190 | 57.842 | 30.684 | 8.058 |
| d10 | 7.063 | 7.063 | 7.063 | 2.363 | 2.179 | 1.195 |
| d14 | 4.332 | 12.477 | 32.992 | 4.332 | 12.477 | 32.992 |
| d20 | 16.889 | 12.505 | 4.087 | 16.889 | 12.505 | 4.087 |
| Bf | 39.683 | 45.490 | 58.820 | 39.683 | 45.490 | 58.820 |

Values Corresponding to Conditions:

$\Delta X_T / \Delta X_W$ = 1.25

-continued

Aspherical Surface Data:

| | Maximum Wide-Angle State | Intermediate | Maximum Telephoto State |
|---|---|---|---|
| $\Delta X$ | 4.70 | 4.88 | 5.87 |
| $\beta_F$ | 28.74 | 3.64 | 2.07 |

As is shown in the "Values Corresponding to Conditions" section of Table 9, from the maximum wide-angle state to the maximum telephoto state, the lateral magnification $\beta_F$ of the front group G2F at an infinite focus state decreases monotonically and the focussing displacement $\Delta X$ of the front group G2F increases monotonically. Further, $\beta_F$ is the lateral magnification of the front group G2F, which is the focussing lens group, at the infinite focus state, and $\Delta X$ is the focussing displacement (with movement toward the object being positive) of the front group G2F to focus from an object at infinity to a close-range object.

Table 10 below shows the spline sample data when the shape of the focussing movement cam in the third embodiment is expressed by a spline function (conforming to "Numerical Analysis and FORTRAN" published by Maruzen Co. and "Spline Functions and Their Applications" published by Kyoiku Shuppan) relating to the displacement in the rotational direction (ANGLE) and the displacement in the direction of the optical axis (DIS). That is, Table 10 shows the displacement in the direction of the optical axis (DIS) and the displacement in the rotational direction (ANGLE) at the spline interpolation sample point. The displacement in the direction of the optical axis (DIS) assumes movement toward the object to be positive.

TABLE 10

| | ANGLE | DIS |
|---|---|---|
| 1 | 0.000 | 0.000 |
| 2 | 9.134 | -0.755 |
| 3 | 13.812 | -1.161 |
| 4 | 18.578 | -1.588 |
| 5 | 28.411 | -2.514 |
| 6 | 41.857 | -3.866 |
| 7 | 50.000 | -4.710 |
| 8 | 59.134 | -5.686 |
| 9 | 63.812 | -6.205 |
| 10 | 68.578 | -6.748 |
| 11 | 78.411 | -7.909 |
| 12 | 91.857 | -9.571 |
| 13 | 100.000 | -10.590 |

Table 11 below shows the infinite focus position (position corresponding to infinity) of the focus cam of the third embodiment for each focal length state, and the rotational displacement (rotation amount for focussing) of the focus cam for each object distance. In Table 3, the zooming rotation amounts from the maximum wide-angle state (f=28.9) to the maximum telephoto state (f=77.5) have been normalized to 50. At this time, the rotation amount for focussing from the infinite focus position (object distance R=$\infty$) to the close focus position (R=0.6) is 50.

TABLE 11

| Focal length | Position Corresponding to Infinity | Object Distance | Focus Rotation Amount For Focusing |
|---|---|---|---|
| 28.9 mm | 0.000 | 3 m | 9.134 |
| 35.0 mm | 3.750 | 2 m | 13.812 |
| 43.0 mm | 9.698 | 1.5 m | 18.578 |
| 50.0 mm | 15.908 | 1 m | 28.411 |
| 65.0 mm | 34.500 | 0.7 m | 41.857 |
| 77.5 mm | 50.000 | 0.6 m | 50.000 |

Next, the question of whether so-called MF (manual focus) is possible in the zoom lens of the third embodiment will be considered. When the displacement of the image plane (imaging point) from a predetermined imaging point position exceeds the focussing depth of the zoom lens, manual focussing (MF) using a helicoid (helix-shaped screw) becomes impossible. Table 12 below shows the displacement of the imaging point (image plane) when an MF operation is undertaken using the focus cam of the third embodiment, in correspondence with each focus length state and each object distance state.

TABLE 12

|  | 0.6 m | 0.7 m | 1 m | 1.5 m | 2 m | 3 m |
|---|---|---|---|---|---|---|
| 28.9 mm | 0.000 | 0.000 | 0.000 | 0.000 | 0.000 | 0.000 |
| 35.0 mm | −0.043 | −0.030 | −0.016 | −0.006 | −0.003 | −0.001 |
| 43.0 mm | −0.041 | 0.021 | −0.016 | −0.004 | 0.000 | 0.001 |
| 50.0 mm | −0.006 | 0.023 | 0.003 | 0.001 | 0.004 | 0.005 |
| 65.0 mm | −0.013 | 0.053 | 0.049 | 0.011 | −0.007 | −0.016 |
| 77.5 mm | 0.000 | 0.000 | 0.000 | 0.000 | 0.000 | 0.000 |

As is clear from Table 12, the displacement of the imaging point at each focal length state and each object distance state is sufficiently small with respect to the focal depth (0.09 mm) of the lens system of the third embodiment, so that accurate manual focussing is possible with little shift of focus.

FIG. 22(a) through FIG. 27(c) are graphs that shows spherical aberration, astigmatism and distortion aberration, respectively, for d-line (λ=587.6 nm) in the third embodiment.

Figure 22A:
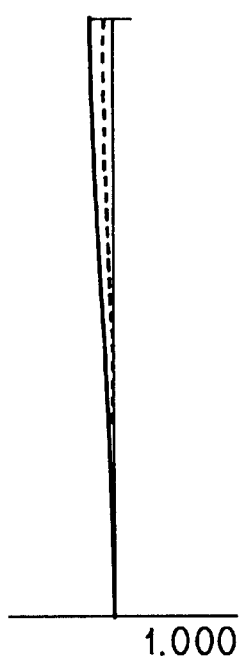
FIGS. 22(a)–22(c) are graphs that show spherical aberration, astigmatism and distortion aberration, respectively, for the infinite focus state at the maximum wide-angle state according to the third embodiment.
Figure 22B:
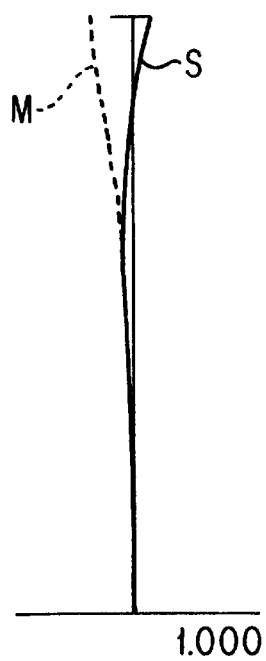
Figure 22C:
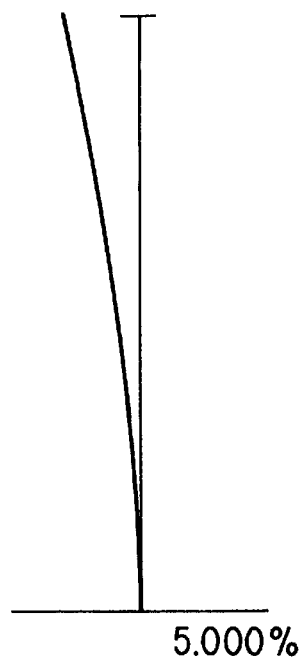
Figure 23A:
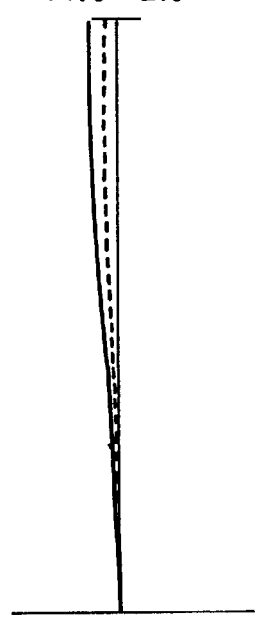
FIGS. 23(a)–23(c) are graphs that show spherical aberration, astigmatism and distortion aberration, respectively, for the infinite focus state at the medium focal length state according to the third embodiment.
Figure 23B:
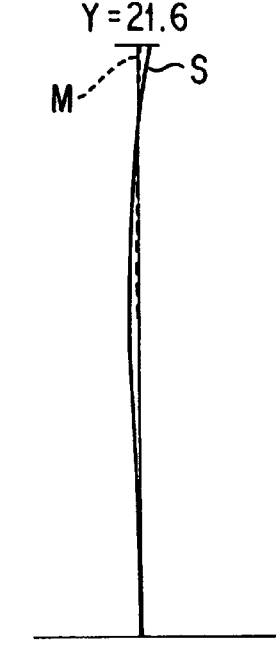
Figure 23C:
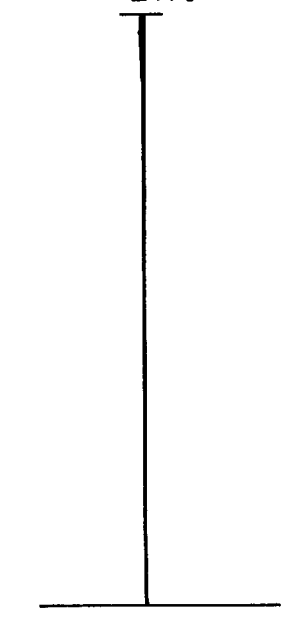
Figure 26A:
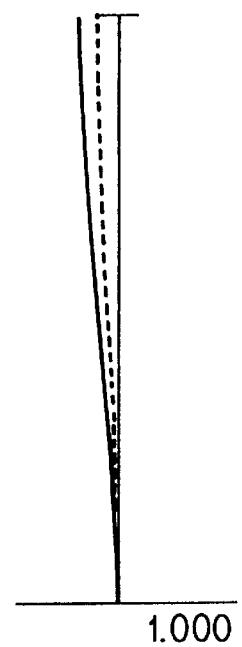
FIGS. 26(a)–26(c) are graphs that show spherical aberration, astigmatism and distortion aberrations, respectively, for the close-range focus state at the medium focal length state according to the third embodiment.
Figure 26B:
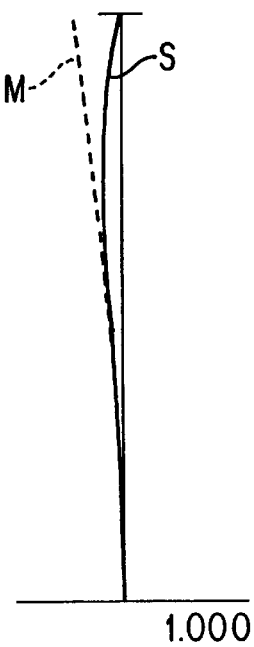
Figure 26C:
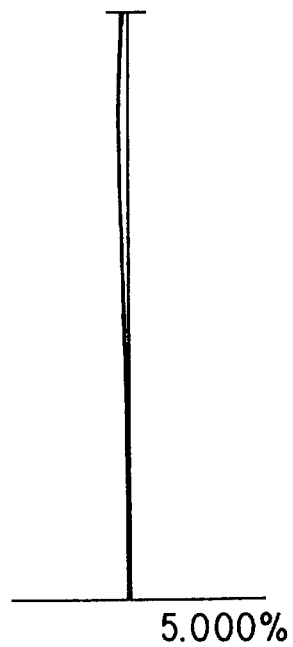
Figure 27A:
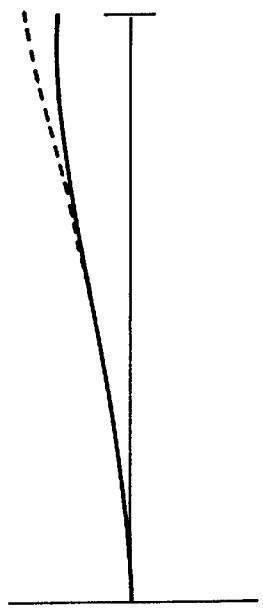
FIGS. 27(a)–27(c) are graphs that show spherical aberration, astigmatism and distortion aberration, respectively, for the close-range focus state at the maximum telephoto state according to the third embodiment.
Figure 27B:
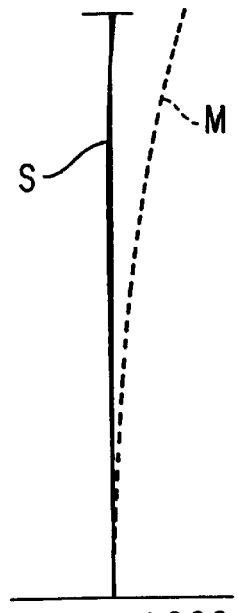
Figure 27C:
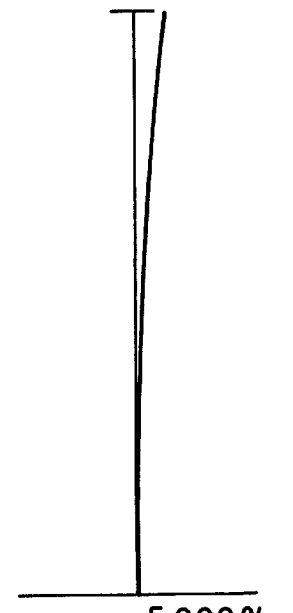

FIGS. 22(a)–22(c) are graphs that show spherical aberration, astigmatism and distortion aberration, respectively, for the infinite focus state at the maximum wide-angle state. FIGS. 23(a)–23(c) are graphs that show spherical aberration, astigmatism and distortion aberration, respectively, for the infinite focus state at the medium focal length state. FIGS. 24(a)–24(c) are graphs that show spherical aberration, astigmatism and distortion aberration, respectively, for the infinite focus state at the maximum telephoto state. FIGS. 25(a)–25(c) are graphs that show spherical aberration, astigmatism and distortion aberration, respectively, for the close-range focus state at the maximum wide-angle state. FIGS. 26(a)–26(c) are graphs that show spherical aberration, astigmatism and distortion aberration, respectively, for the close-range focus state at the medium focal length state. FIGS. 27(a)–27(c) are graphs that show spherical aberration, astigmatism and distortion aberrations, respectively, for the close-range focus state at the maximum telephoto state.

FIGS. 28(a)–28(d) are graphs that show astigmatism and coma aberration, respectively, for the maximum wide-angle state (infinite focus state) and the maximum telephoto state (infinite focus state) prior to image stabilizing in the third embodiment. FIGS. 29(a)–29(d) are graphs that show astigmatism and coma aberration, respectively, for the maximum wide-angle state (infinite focus state) and the maximum telephoto state (infinite focus state) at the time of image stabilizing in the first embodiment. In FIGS. 29(a)–29(d), the various aberrations amounts are shown for the case wherein the front group G2F is off-center by an amount corresponding to a field angle of 0.2°.

In each aberration graph, FNO denotes F-number, NA denotes numerical aperture, and Y denotes image height. Further, in the aberration graphs showing astigmatism, the solid line represents sagittal image plane while the broken line represents the meridional image plane. In the aberration diagram describing spherical surface aberration, the broken line represents the sine condition.

As the aberration graphs in FIG. 22(a) through FIG. 27(c) clearly show, with the third embodiment the various aberrations are favorably corrected at each object distance state from the maximum wide-angle state to the maximum telephoto state. As the aberration graphs in FIGS. 28(a)–28(d) and FIGS. 29(a)–29(d) clearly show, with the third embodiment the aberration fluctuations are smaller at the time of image stabilizing compared to prior to image stabilizing, and image stabilizing is possible because favorable imaging performance is maintained.

FIG. 30 is a schematic side view of the lens structure of a zoom lens according to a fourth embodiment of the invention.

The zoom lens of FIG. 30 includes, in order from the object side to the image side, a first lens group G1 having negative refractive power, a second lens group G2 having positive refractive power, a third lens group G3 having negative refractive power and a fourth lens group G4 having positive refractive power.

The zoom lens of the fourth embodiment is a large-diameter zoom lens having a focal length of 28.8 to 55.0 mm and a large zooming ratio with an F number of 2.9, and close-range is set at 0.6 m.

The first lens group G1 includes, in order from the object side, a negative meniscus lens with a convex surface facing the object side, a biconcave lens and a positive meniscus lens with a convex surface facing the object side. The second lens group G2, includes in order from the object side, a front group G2F with a positive cemented lens formed of a negative meniscus lens with a convex surface facing the object side and a biconvex lens, and a rear group G2R formed of a biconvex lens and a positive meniscus lens with a convex surface facing the object side.

The third lens group G3 includes, in order from the object side, a negative cemented lens formed of a positive meniscus lens with a concave surface facing the object side and a biconcave lens, and a biconcave lens. The fourth lens group G4 includes, in order from the object side, a positive cemented lens formed of a negative meniscus with a convex surface facing the object side and a biconvex lens, a biconvex lens, and a negative meniscus lens with a concave surface facing the object side. The aperture diaphragm S is positioned between the second lens group G2 and the third lens group G3.

FIG. 30 shows the positional relationship of each of the lens groups at the maximum wide-angle state, and the lens groups move on the optical axis along the zoom loci indicated by the arrows in FIG. 10 during zooming to the maximum telephoto state. The front group G2F and the rear group G2R of the second lens group G2 move integrally when zooming from the maximum wide-angle state to the maximum telephoto state.

In addition, focussing on close-range objects is accomplished by moving the front group G2F of the second lens group G2 toward the image side along the optical axis. Further, fluctuations in the image position that are caused by camera shaking are corrected by causing the front group G2F of the second lens group G2 to move in a direction orthogonal to the optical axis.

The values of various dimensions of the fourth embodiment of the invention are listed in Table 13 below. In the ensuing data, f denotes focal length, FNO denotes F-number, 2ω denotes the field angle, Bf denotes back focus, β denotes photographic magnification and do denotes the distance along the optical axis between the object and the surface farthest to the object side. The surface number indicates an order of the lens surfaces from the object side along a direction in which the light rays move, and the refractive indices and Abbe numbers are the values corresponding to a d-line (λ=587.6 nm).

TABLE 13 f = 28.8~55.0
FNO = 2.9
2ω = 74.9~42.5

| Surface Number | Radius of Curvature | Intersurface Distance | Abbe Number | Refractive Index |
|---|---|---|---|---|
| 1 | 78.335 | 3.00 | 65.42 | 1.60300 |
| 2 | 29.816 | 11.5 | | |
| 3 | −672.667 | 2.40 | 65.42 | 1.60300 |
| 4* | 40.350 | 0.10 | | |
| 5 | 40.436 | 4.20 | 23.01 | 1.86074 |
| 6 | 58.651 | (d6 = variable) | | |
| 7 | 41.147 | 1.60 | 23.01 | 1.86074 |
| 8 | 26.873 | 7.50 | 69.98 | 1.51860 |
| 9 | −242.748 | (d9 = variable) | | |
| 10 | 137.583 | 3.60 | 65.42 | 1.60300 |
| 11 | −127.621 | 0.10 | | |
| 12 | 39.423 | 4.20 | 60.14 | 1.62041 |
| 13 | 92.872 | (d13 = variable) | | |
| 14 | 36.353 | 2.60 | 23.01 | 1.86074 |
| 15 | −25.024 | 1.40 | 82.52 | 1.49782 |
| 16 | 1526.942 | 1.80 | | |
| 17 | −493.881 | 1.40 | 60.23 | 1.51835 |
| 18* | 52.468 | (d18 = variable) | | |
| 19 | 190.478 | 1.40 | 23.01 | 1.86074 |
| 20 | 44.480 | 6.00 | 82.52 | 1.49782 |
| 21 | −43.612 | 0.10 | | |
| 22 | 61.373 | 3.80 | 55.60 | 1.69680 |
| 23 | −143.833 | 6.0 | | |
| 24 | −29.577 | 2.00 | 39.61 | 1.80454 |
| 25 | −38.903 | (Bf = variable) | | |

Aspherical Surface Data:

Surface 4:

κ         $C_2$         $C_4$
−0.3101   0.0000        −2.7453 × $10^{-7}$
$C_6$     $C_8$         $C_{10}$
−1.1797 × $10^{-10}$   −9.9315 × $10^{-13}$   5.9137 × $10^{-16}$

Surface 18:

κ         $C_2$         $C_4$
−4.7915   0.0000        0.0000
$C_6$     $C_8$         $C_{10}$
0.0000    −4.4142 × $10^{-11}$   6.5813 × $10^{-14}$

Variable Distance for Zooming:

| f/β | 28.9 | 45.0 | 55.0 | −0.0600 | −0.0913 | −0.1118 |
|---|---|---|---|---|---|---|
| d0 | ∞ | ∞ | ∞ | 427.604 | 443.078 | 443.784 |
| d6 | 44.131 | 18.925 | 10.834 | 48.087 | 23.068 | 15.220 |
| d9 | 6.651 | 6.651 | 6.651 | 2.695 | 2.509 | 2.267 |
| d13 | 5.452 | 13.733 | 17.606 | 5.452 | 13.733 | 17.606 |
| d18 | 15.036 | 9.985 | 7.764 | 15.036 | 9.985 | 7.764 |
| Bf | 38.550 | 45.415 | 51.402 | 38.550 | 45.415 | 51.402 |

Values Corresponding to Conditions:
$\Delta X_T / \Delta X_W = 1.11$

| | Maximum Wide-Angle State | Intermediate | Maximum Telephoto State |
|---|---|---|---|
| ΔX | 3.96 | 4.14 | 4.38 |
| $β_F$ | 30.21 | 3.44 | 2.68 |

As is shown in the "Values Corresponding to Conditions" section of Table 13, from the maximum wide-angle state to the maximum telephoto state, the lateral magnification $β_F$ of the front group G2F at an infinite focus state decreases monotonically and the focussing displacement ΔX of the front group G2F increases monotonically. Further, $β_F$ is the lateral magnification of the front group G2F, which is the focussing lens group, at the infinite focus state, and ΔX is the focussing displacement (with movement toward the object being positive) of the front group G2F in order to focus from an object at infinity to a close-range object.

Table 14 below shows the spline sample data when the shape of the focus cam in the fourth embodiment is expressed by a spline function relating to the displacement in the rotational direction (ANGLE) and the displacement in the direction of the optical axis (DIS). That is, Table 14 shows the displacement in the direction of the optical axis (DIS) and the displacement in the rotational direction (ANGLE) at the spline interpolation sample point. The displacement in the direction of the optical axis (DIS) assumes movement toward the object to be positive.

TABLE 14

| | ANGLE | DIS |
|---|---|---|
| 1 | 0.000 | 0.000 |
| 2 | 8.783 | −0.660 |
| 3 | 13.857 | −1.013 |
| 4 | 18.043 | −1.382 |
| 5 | 27.874 | −2.174 |
| 6 | 41.517 | −3.313 |
| 7 | 50.000 | −4.013 |
| 8 | 58.783 | −4.775 |
| 9 | 63.357 | −5.178 |
| 10 | 68.043 | −5.597 |
| 11 | 77.874 | −6.488 |
| 12 | 91.517 | −7.746 |
| 13 | 100.000 | −8.509 |

Table 15 below shows the infinite focus position (position corresponding to infinity) of the focus cam of the fourth embodiment for each focal length state, and the rotational displacement (rotation amount for focussing) of the focus cam for each object distance. In Table 15, the zooming rotation amounts from the maximum wide-angle state (f=28.9) to the maximum telephoto state (f=55.0) have been normalized to 50. At this time, the rotation amount for focussing from the infinite focus position (object distance R=∞) to the close focus position (R=0.6) is 50.

TABLE 16

| Focal length | Position Corresponding to Infinity | Object Distance | Rotation Amount For Focussing |
|---|---|---|---|
| 28.9 mm | 0.000 | 3 m | 8.783 |
| 35.0 mm | 6.837 | 2 m | 13.357 |
| 40.0 mm | 14.050 | 1.5 m | 18.043 |
| 45.0 mm | 23.551 | 1 m | 27.874 |
| 50.0 mm | 36.692 | 0.7 m | 41.517 |
| 55.0 mm | 50.000 | 0.6 m | 50.000 |

Next, the question of whether so-called MF (manual focus) is possible in the zoom lens of the fourth embodiment will be considered. Table 17 below shows the displacement of the imaging point (image plane) when an MF operation is undertaken using the focus cam of the fourth embodiment, in correspondence with each focus length state and each object distance state.

TABLE 17

|  | 0.6 m | 0.7 m | 1 m | 1.5 m | 2 m | 3 m |
|---|---|---|---|---|---|---|
| 28.9 mm | 0.000 | 0.000 | 0.000 | 0.000 | 0.000 | 0.000 |
| 35.0 mm | −0.034 | −0.012 | −0.016 | −0.006 | −0.004 | −0.002 |
| 40.0 mm | −0.039 | −0.004 | −0.014 | −0.009 | 0.005 | 0.002 |
| 45.0 mm | −0.035 | 0.009 | 0.017 | −0.006 | −0.010 | −0.006 |
| 50.0 mm | −0.031 | 0.022 | 0.032 | 0.033 | 0.028 | 0.014 |
| 55.0 mm | 0.000 | 0.000 | 0.000 | 0.000 | 0.000 | 0.000 |

As is clear from Table 17, the displacement of the imaging point at each focal length state and each object distance state is sufficiently small with respect to the focal depth (0.09 mm) of the lens system of the fourth embodiment, so that accurate manual focussing is possible with little shift of focus.

FIG. 31(a) through FIG. 36(c) are graphs that show spherical aberration, astigmatism and distortion aberration, respectively, for d-line (λ=587.6 nm) in the second embodiment.

Figure 33A:
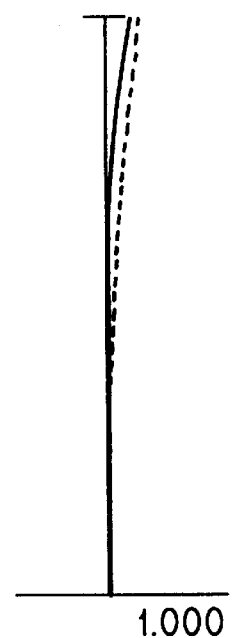
FIGS. 33(a)–33(c) are graphs that show spherical aberration, astigmatism and distortion aberration, respectively, for the infinite focus state at the maximum telephoto state according to the fourth embodiment.
Figure 33B:
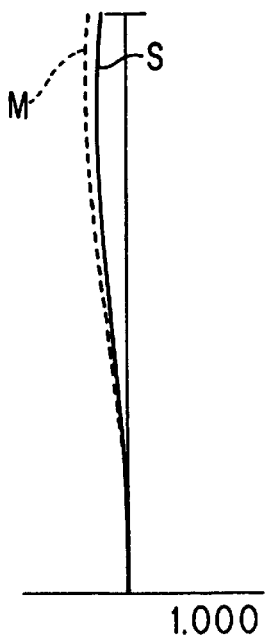
Figure 33C:

FIGS. 31(a)–31(c) are graphs that show spherical aberration, astigmatism and distortion aberration, respectively, for the infinite focus state at the maximum wide-angle state. FIGS. 32(a)–32(c) are graphs that show spherical aberration, astigmatism and distortion aberration, respectively, for the infinite focus state at the medium focal length state. FIGS. 33(a)–33(c) are graphs that show spherical aberration, astigmatism and distortion aberration, respectively, for the infinite focus state at the maximum telephoto state.

Figure 34A:
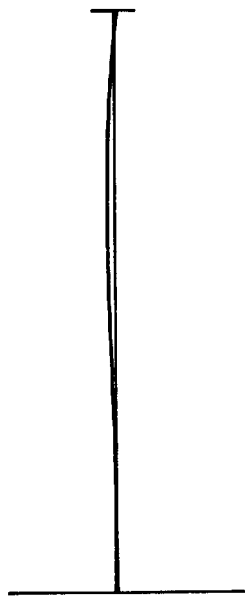
FIGS. 34(a)–34(c) are graphs that show spherical aberration, astigmatism and distortion aberration, respectively, for the close-range focus state at the maximum wide-angle state according to the fourth embodiment.
Figure 34B:
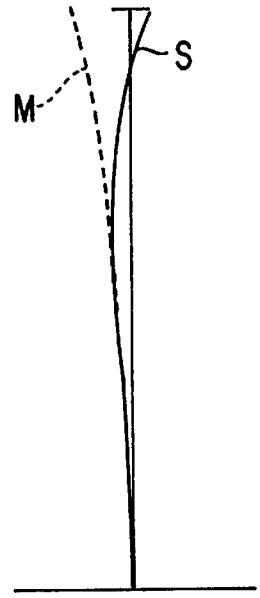
Figure 34C:
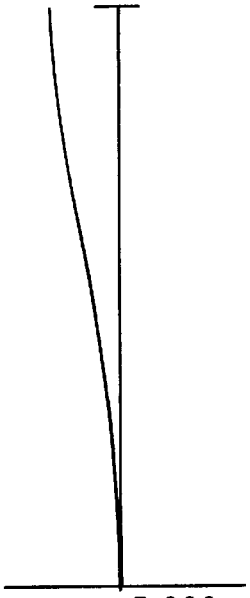

FIGS. 34(a)–34(c) for the close-range focus state at the maximum wide-angle state. FIGS. 35(a)–35(c) are graphs that show spherical aberration, astigmatism and distortion aberration, respectively, for the close-range focus state at the medium focal length state. FIGS. 36(a)–36(c) are graphs that show spherical aberration, astigmatism and distortion aberration, respectively, for the close-range focus state at the maximum telephoto state.

In each aberration graph, FNO denotes F-number, NA denotes numerical aperture and Y denotes image height. In the aberration graphs showing astigmatism, the solid line represents the sagittal image plane while the broken line represents the meridional image plane. In the aberration graphs describing spherical surface aberration, the broken line represents the sine condition.

As the aberration graphs clearly show, with the fourth embodiment the various aberrations are favorably corrected at each object distance state from the maximum wide-angle state to the maximum telephoto state.

Figure 37:
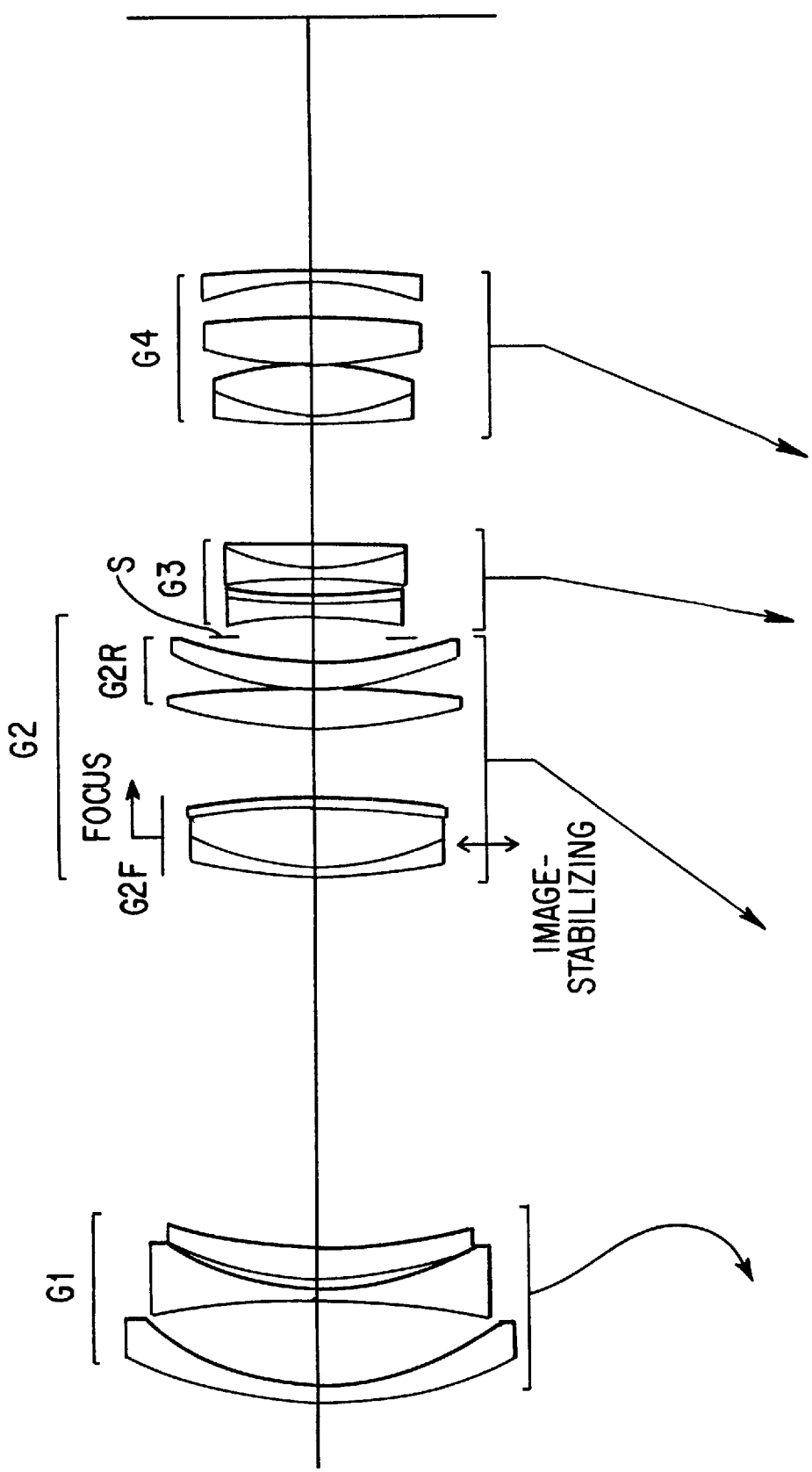
FIG. 37 is a schematic side view of the lens structure of a zoom lens according to a fifth embodiment of the invention.

FIG. 37 is a schematic view of the lens structure of a zoom lens according to a fifth embodiment of the invention.

The zoom lens of FIG. 37 includes, in order from the object side to the image side, a first lens group G1 having negative refractive power, a second lens group G2 having positive refractive power, a third lens group G3 having negative refractive power and a fourth lens group G4 having positive refractive power.

The zoom lens of the fifth embodiment is a large-diameter zoom lens having a focal length of 28.9 to 82.5 mm and a large zooming ratio with an F number of 2.9, and close-range is set at 0.6 m.

The first lens group G1 includes, in order from the object side, a negative meniscus lens with a convex surface facing the object side, a biconcave lens and a positive meniscus lens with a convex surface facing the object side. The second lens group G2 includes, in order from the object side, a front group G2F with a positive cemented lens formed of a negative meniscus lens with a convex surface facing the object side, a biconvex lens and a negative meniscus lens with a concave surface facing the object side, and a rear group G2R formed of a biconvex lens and a positive meniscus lens with a convex surface facing the object side.

The third lens group G3 includes, in order from the object side, a negative cemented lens formed of a biconcave lens and a negative meniscus lens with a convex surface facing the object side, and a negative cemented lens formed of a biconcave lens and a biconvex lens. The fourth lens group G4 includes, in order from the object side, a positive cemented lens formed of a negative meniscus with a convex surface facing the object side and a biconvex lens, a biconvex lens, and a negative meniscus lens with a concave surface facing the object side. The aperture diaphragm S is positioned between the second lens group G2 and the third lens group G3.

FIG. 37 shows the positional relationship of each of the lens groups at the maximum wide-angle state, and the lens groups move on the optical axis along the zoom loci indicated by the arrows in FIG. 37 during zooming to the maximum telephoto state. The front group G2F and the rear group G2R of the second lens group G2 move integrally when zooming from the maximum wide-angle state to the maximum telephoto state.

In addition, focussing on close-range objects is accomplished by moving the front group G2F of the second lens group G2 toward the image side along the optical axis. Further, fluctuations in the image position that are caused by camera shaking are corrected by causing the front group G2F of the second lens group G2 to move in a direction orthogonal to the optical axis.

The values of various dimensions of the fifth embodiment of the invention are listed in Table 18 below. In the ensuing data, f denotes focal length, FNO denotes F-number, 2ω denotes the field angle, Bf denotes back focus, β denotes photographic magnification and do denotes the distance along the optical axis between the object and the surface farthest to the object side. The surface number indicates an order of the lens surfaces from the object side along a direction in which the light rays move, and the refractive indices and Abbe numbers are the values corresponding to a d-line (λ=587.6 nm).

TABLE 18 f = 28.9~82.5
FNO = 2.9
2ω = 76.1~28.9

| Surface Number | Radius of Curvature | Intersurface Distance | Abbe Number | Refractive Index |
|---|---|---|---|---|
| 1 | 68.649 | 2.30 | 65.42 | 1.60300 |
| 2 | 42.005 | 12.00 | | |
| 3 | −200.063 | 2.00 | 58.50 | 1.65160 |
| 4 | 39.669 | 1.70 | | |
| 5 | 56.552 | 4.40 | 23.01 | 1.86074 |
| 6 | 80.192 | (d6 = variable) | | |
| 7 | 74.866 | 1.60 | 23.01 | 1.86074 |
| 8 | 42.253 | 8.60 | 64.10 | 1.51680 |
| 9 | −111.649 | 1.60 | 25.50 | 1.80458 |
| 10 | −125.706 | (d10 = variable) | | |
| 11 | 63.859 | 6.00 | 60.14 | 1.62041 |
| 12 | −143.764 | 0.10 | | |
| 13 | 48.361 | 4.00 | 55.60 | 1.69680 |
| 14 | 63.052 | (d14 = variable) | | |
| 15 | −80.845 | 2.20 | 35.72 | 1.90265 |
| 16 | 140.240 | 1.40 | 64.10 | 1.51680 |
| 17 | 83.911 | 2.50 | | |
| 18 | −73.986 | 1.40 | 82.52 | 1.49782 |
| 19 | 31.399 | 3.50 | 25.50 | 1.80458 |
| 20 | −1240.249 | (d20 = variable) | | |
| 21 | 138.989 | 1.40 | 23.01 | 1.86074 |
| 22 | 33.034 | 7.30 | 82.52 | 1.49782 |
| 23 | −42.064 | 0.10 | | |
| 24 | 55.077 | 7.00 | 57.53 | 1.67025 |
| 25 | −116.050 | 5.20 | | |
| 26 | −48.854 | 2.00 | 39.61 | 1.80454 |
| 27 | −180.965 | (Bf = variable) | | |

Aspherical Surface Data:

Surface 4:

| K | $C_2$ | $C_4$ |
|---|---|---|
| 0.0730 | 0.0000 | $-4.4790 \times 10^{-7}$ |
| $C_6$ | $C_8$ | $C_{10}$ |
| $-5.8276 \times 10^{-10}$ | $6.0545 \times 10^{-13}$ | $-2.6103 \times 10^{-16}$ |

Surface 18:

| κ | $C_2$ | $C_4$ |
|---|---|---|
| 11.1165 | 0.0000 | $-3.2602 \times 10^{-6}$ |
| $C_6$ | $C_8$ | $C_{10}$ |
| $2.0017 \times 10^{-8}$ | $-8.6879 \times 10^{-11}$ | $2.0447 \times 10^{-13}$ |

Variable Distance for Zooming:

| f/β | 28.9 | 50.0 | 82.5 | −0.0642 | −0.1074 | −0.1813 |
|---|---|---|---|---|---|---|
| d0 | ∞ | ∞ | ∞ | 395.278 | 416.064 | 409.886 |
| d6 | 54.125 | 18.730 | 1.278 | 59.102 | 24.513 | 8.259 |
| d10 | 10.017 | 10.017 | 10.017 | 5.039 | 4.235 | 3.036 |
| d14 | 6.409 | 18.592 | 40.734 | 6.409 | 18.592 | 40.734 |
| d20 | 17.467 | 10.521 | 2.699 | 17.467 | 10.521 | 2.699 |
| Bf | 38.579 | 47.951 | 57.261 | 38.579 | 47.949 | 57.255 |

Values Corresponding to Conditions
$\Delta X_T/\Delta X_W = 1.40$

| | Maximum Wide-angle State | Intermediate | Maximum Telephoto State |
|---|---|---|---|
| ΔX | 4.98 | 5.78 | 6.99 |
| $\beta_F$ | 4.65 | 2.14 | 1.69 |

As is shown in the "Values Corresponding to Conditions" section of Table 18, from the maximum wide-angle state to the maximum telephoto state, the lateral magnification $\beta_F$ of the front group G2F at an infinite focus state decreases monotonically and the focussing displacement ΔX of the front group G2F increases monotonically. Further, $\beta_F$ is the lateral magnification of the front group G2F, which is the focussing lens group, at the infinite focus state, and ΔX is the focussing displacement (with movement toward the object being positive) of the front group G2F in order to focus from an object at infinity to a close-range object.

Table 19 below shows the spline sample data when the shape of the focus cam in the fifth embodiment is expressed by a spline function relating to the displacement in the rotational direction (ANGLE) and the displacement in the direction of the optical axis (DIS). That is, Table 19 shows the displacement in the direction of the optical axis (DIS) and the displacement in the rotational direction (ANGLE) at the spline interpolation sample point. The displacement in the direction of the optical axis (DIS) assumes movement toward the object to be positive.

TABLE 19

| | ANGLE | DIS |
|---|---|---|
| 1 | 0.000 | 0.000 |
| 2 | 9.481 | −0.792 |
| 3 | 14.283 | 1.219 |
| 4 | 19.136 | −1.669 |
| 5 | 29.025 | −2.647 |
| 6 | 42.188 | −4.081 |
| 7 | 50.000 | −4.981 |
| 8 | 59.481 | −6.135 |
| 9 | 64.283 | −6.751 |
| 10 | 69.136 | −7.394 |
| 11 | 79.025 | −8.773 |
| 12 | 92.188 | −10.751 |
| 13 | 100.000 | −11.966 |

Table 20 below shows the infinite focus position (position corresponding to infinity) of the focus cam of the fifth embodiment for each focal length state, and the rotational displacement (rotation amount for focussing) of the focus cam for each object distance. In Table 20, the zooming rotation amounts from the maximum wide-angle state (f=28.9) to the maximum telephoto state (f=82.5) have been normalized to 50. At this time, the focus rotation amount for focussing from the infinite focus position (object distance R=∞) to the close focus position (R=0.6) is 50.

TABLE 20

| Focal length | Position Corresponding to Infinity | Object Distance | Rotation Amount For Focussing |
|---|---|---|---|
| 28.9 mm | 0.000 | 3 m | 9.481 |
| 40.0 mm | 11.402 | 2 m | 14.283 |
| 50.0 mm | 21.463 | 1.5 m | 19.136 |
| 60.0 mm | 31.453 | 1 m | 29.025 |
| 70.0 mm | 40.646 | 0.7 m | 42.188 |
| 82.5 mm | 50.000 | 0.6 m | 50.000 |

Next, the question of whether so-called MF (manual focus) is possible in the zoom lens of the fifth embodiment will be considered. Table 21 below shows the displacement of the imaging point when an MF operation is undertaken using the focussing movement cam of the third embodiment, in correspondence with each focus length state and each object distance state.

TABLE 21

|  | 0.6 m | 0.7 m | 1 m | 1.5 m | 2 m | 3 m |
|---|---|---|---|---|---|---|
| 28.9 mm | 0.000 | 0.000 | 0.000 | 0.000 | 0.000 | 0.000 |
| 40.0 mm | −0.035 | −0.015 | −0.014 | −0.001 | 0.002 | 0.003 |
| 50.0 mm | −0.031 | 0.005 | −0.001 | −0.007 | −0.002 | 0.003 |
| 60.0 mm | −0.042 | 0.017 | 0.015 | −0.001 | −0.009 | −0.012 |
| 70.0 mm | −0.059 | 0.015 | 0.025 | 0.018 | 0.010 | 0.020 |
| 82.5 mm | 0.000 | 0.000 | 0.000 | 0.000 | 0.000 | 0.000 |

As is clear from Table 21, the displacement of the imaging point at each focal length state and each object distance state is sufficiently small with respect to the focal depth (0.09 mm) of the lens system of the fifth embodiment, so that accurate manual focussing is possible with little shift of focus.

FIG. 38(a) through FIG. 43(c) are graphs that show spherical abberation, astigmatism distortion aberration, respectively, for d-line (λ=587.6 nm) in the fifth embodiment.

Figure 38A:
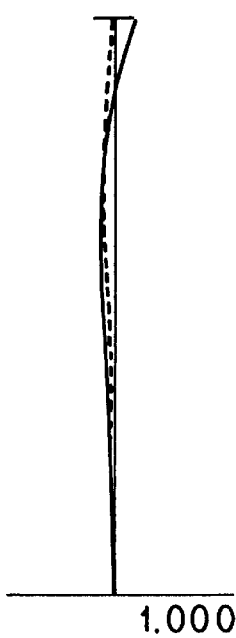
FIGS. 38(a)–38(c) are graphs that show spherical aberration, astigmatism and distortion aberration, respectively, for the infinite focus state at the maximum wide-angle state according to the fifth embodiment.
Figure 38B:
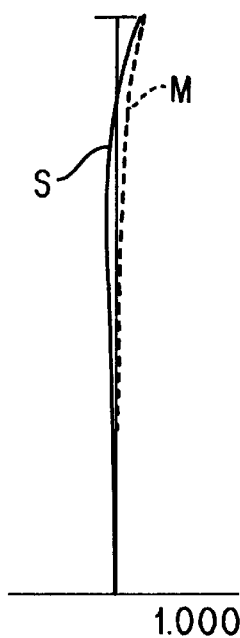
Figure 38C:
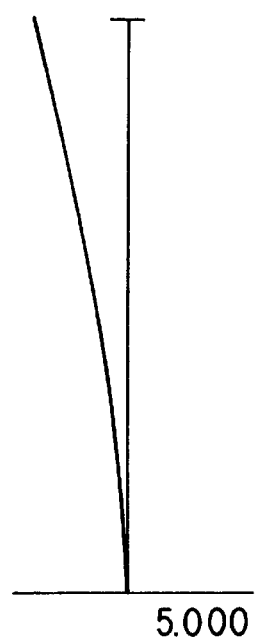
Figure 39A:
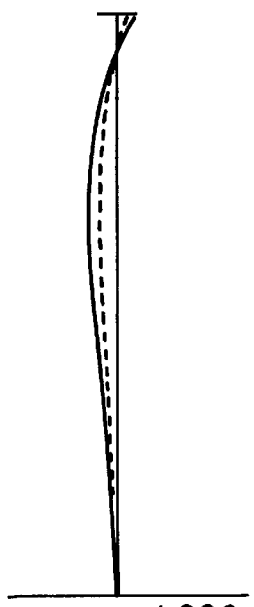
FIGS. 39(a)–39(c) are graphs that show spherical aberration, astigmatism and distortion aberration, respectively, for the infinite focus state at the medium focal length state according to the fifth embodiment.
Figure 39B:
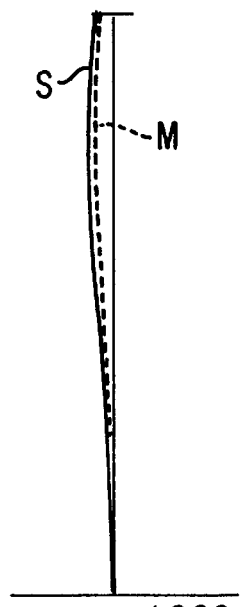
Figure 39C:
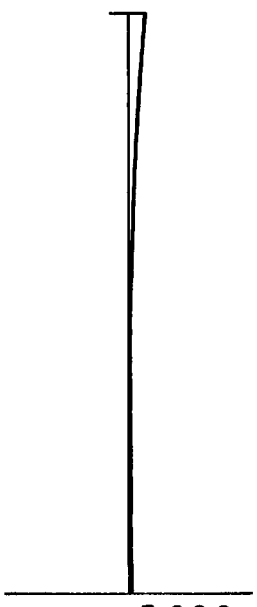
Figure 40A:
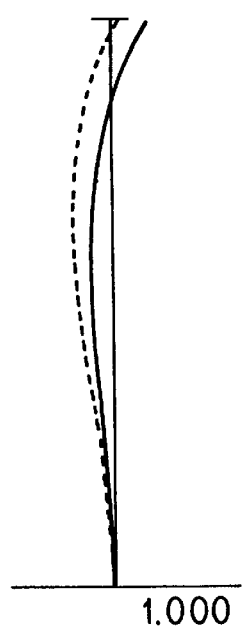
FIGS. 40(a)–40(c) are graphs that show spherical aberration, astigmatism and distortion aberration, respectively, for the infinite focus state at the maximum telephoto state according to the fifth embodiment.
Figure 40B:
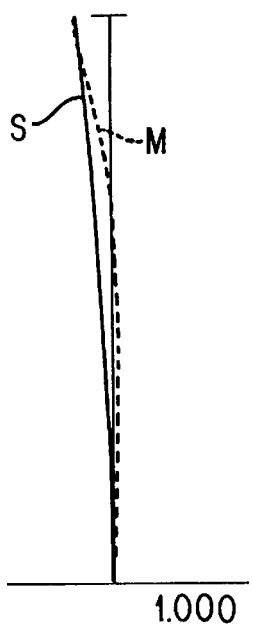
Figure 40C:
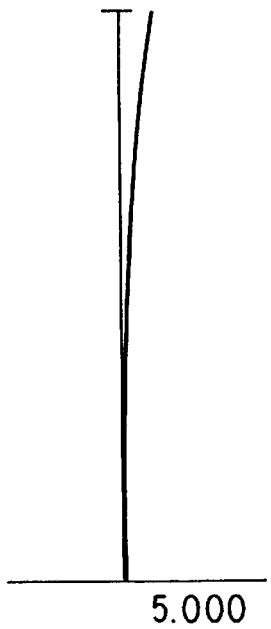

FIGS. 38(a)–38(c) are graphs that show spherical aberration, astigmatism and distortion aberration, respectively, for infinite focus state at the maximum wide-angle state. FIGS. 39(a)–39(c) are graphs that show spherical aberration, astigmatism and distortion aberrationm respectively, for the infinite focus state at the medium focal length state. FIGS. 40(a)–40(c) are graphs that show spherical aberration, astigmatism and distortion aberration, respectively, for the infinite focus state at the maximum telephoto state.

Figure 41A:
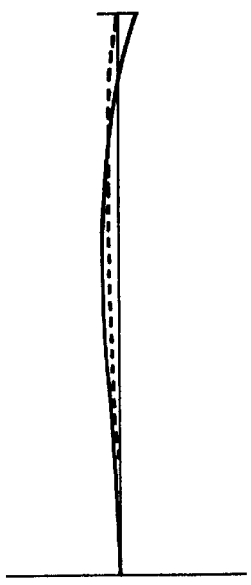
FIGS. 41(a)–41(c) are graphs that show spherical aberration, astigmatism and distortion aberration, respectively, for the close-range focus state at the maximum wide-angle state according to the fifth embodiment.
Figure 41B:
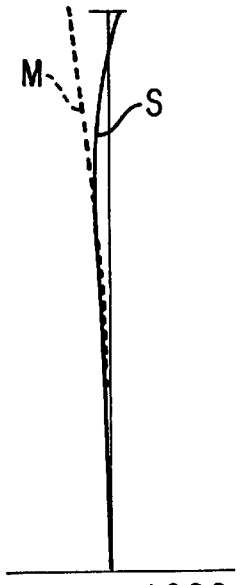
Figure 41C:
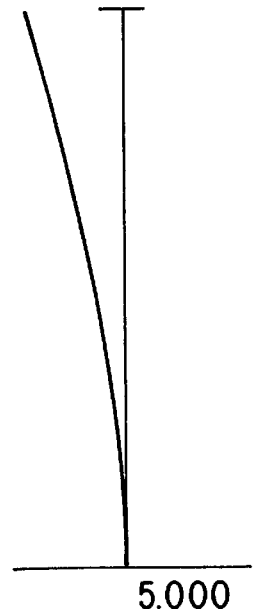
Figure 42A:
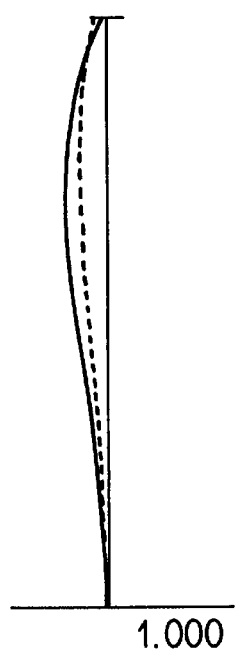
FIGS. 42(a)–42(c) are graphs that show spherical aberration, astigmatism and distortion aberration, respectively, for the close-range focus state at the medium focal length state in the third embodiment.
Figure 42B:
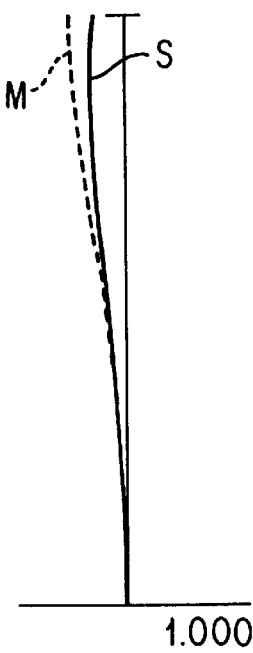
Figure 42C:
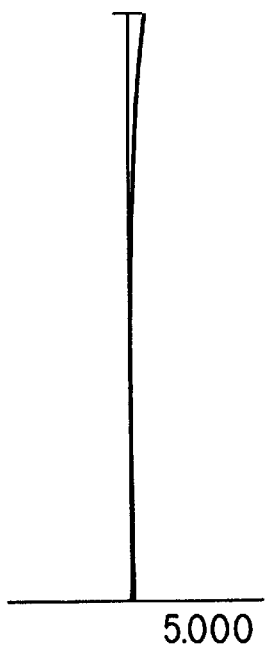
Figure 43A:
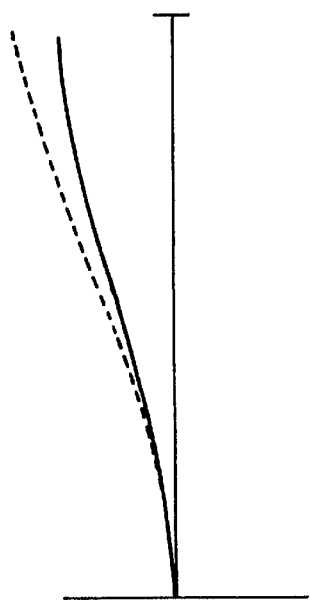
FIGS. 43(a)–43(c) are graphs that show spherical aberration, astigmatism and distortion aberration, respectively, for the close-range focus state at the maximum telephoto state in the third embodiment.
Figure 43B:
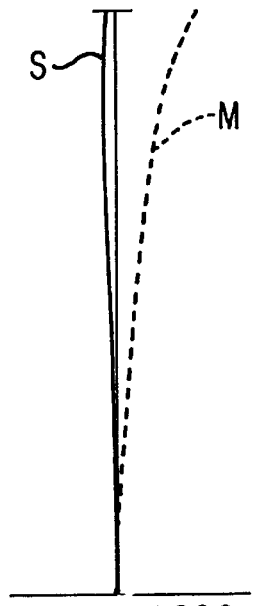
Figure 43C:
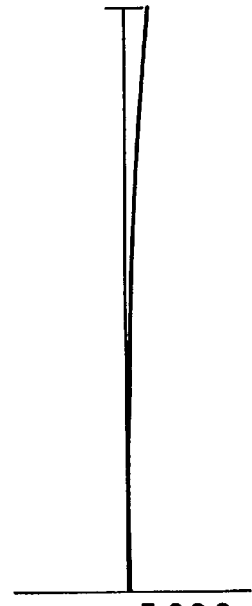

FIGS. 41(a)–41(c) are graphs that show spherical aberration, astigmatism and distortion aberration, respectively, for the close-range focus state at the maximum wide-angle state. FIGS. 42(a)–42(c) are graphs that show spherical aberration, astigmatism and distortion aberration, respectively, for the close-range focus state at the medium focal length state. FIGS. 43(a)–43(c) are graphs that show spherical aberration, astigmatism and distortion aberration, respectively, for the close-range focus state at the maximum telephoto state.

In each aberration graph, FNO denotes F-number, NA denotes numerical aperture and Y denotes image height. Further, in the aberration graphs showing astigmatism, the solid line represents the sagittal image plane while the broken line represents the meridional image plane. Furthermore, in the aberration graphs describing spherical surface aberration, the broken line represents the sine condition.

As the aberration graphs clearly show, with the fifth embodiment the various aberrations are favorably corrected at each object distance state from the maximum wide-angle state to the maximum telephoto state.

As described above, with the invention, it is possible to realize a large diameter zoom lens with a large zooming ratio which has an image stabilizing function and with which accurate manual focussing is possible with little shift of focus and auto focussing is possible with high driving efficiency.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A zoom lens with a zooming ratio of at least 1.5, the zoom lens comprising, in order from an object side to an image side:

a first lens group having a negative refractive power; a second lens group having a positive refractive power;

a third lens group having a positive refractive power;

a fourth lens group having a negative refractive power; and a fifth lens group having a positive refractive power, wherein when zooming from a maximum wide-angle state to a maximum telephoto state, a lateral magnification of the second lens group is always positive and decreases monotonically and, during zooming from the maximum wide-angle state to a maximum telephoto state, the following conditions are satisfied:

$$0.0 < \Delta X4/\Delta X2 < 0.3 \ (0 < \Delta X4)$$

$$0.3 < \Delta X5/\Delta X2 < 0.75 \ (0 < \Delta X5)$$

where ΔX2 is a displacement of the second lens group in the direction of the optical axis of the zoom lens from the maximum wide-angle state to the maximum telephoto state, ΔX4 is a displacement of the fourth lens group in the direction of the optical axis from the maximum wide-angle state to the maximum telephoto state, and ΔX5 is a displacement of the fifth lens group in the direction of the optical axis from the maximum wide-angle state to the maximum telephoto state.

2. The zoom lens of claim 1, wherein focusing on close-range objects is accomplished by causing the second lens group to move along the optical axis.

3. The zoom lens of claim 1, wherein when zooming from the maximum wide-angle state to the maximum telephoto state, the second lens group moves along a locus which is convex toward the object side, and the third lens group moves along a substantially linear locus.

4. The zoom lens of claim 2, wherein when zooming from the maximum wide-angle state to the maximum telephoto state, the second lens group moves along a locus which is convex toward the object side, and the third lens group moves along a substantially linear locus.

5. The zoom lens of claim 1, wherein when zooming from the maximum wide-angle state to the maximum telephoto state, the second lens group moves along a substantially linear locus and the third lens group moves along a locus which is convex toward the object side.

6. The zoom lens of claim 2, wherein when zooming from the maximum wide-angle state to the maximum telephoto state, the second lens group moves along a substantially linear locus and the third lens group moves along a locus which is convex toward the object side.

7. The zoom lens of claim 1, wherein the following condition is satisfied:

$$1.0 < \Delta X_T/\Delta X_W < 1.5$$

where $\Delta X_W$ is a displacement of the second lens group in order to focus from an object at infinity to a close-range object at the maximum wide-angle state, and $\Delta X_T$ is a displacement of the second lens group in order to focus from an object at infinity to a close-range object at the maximum telephoto state.

8. The zoom lens of claim 2, wherein the following condition is satisfied:

$$1.0 < \Delta X_T/\Delta X_W < 1.5$$

where $\Delta X_W$ is a displacement of the second lens group in order to focus from an object at infinity to a close-range object at the maximum wide-angle state, and $\Delta X_T$ is a displacement of the second lens group in order to focus from an object at infinity to a close-range object at the maximum telephoto state.

9. The zoom lens of claim 3, wherein the following condition is satisfied:

$$1.0 < \Delta X_T / \Delta X_W < 1.5$$

where $\Delta X_W$ is a displacement of the second lens group in order to focus from an object at infinity to a close-range object at the maximum wide-angle state, and $\Delta X_T$ is a displacement of the second lens group in order to focus from an object at infinity to a close-range object at the maximum telephoto state.

10. The zoom lens of claim 5, wherein the following condition is satisfied:

$$1.0 < \Delta X_T / \Delta X_W < 1.5$$

where $\Delta X_W$ is a displacement of the second lens group in order to focus from an object at infinity to a close-range object at the maximum wide-angle state, and $\Delta X_T$ is a displacement of the second lens group in order to focus from an object at infinity to a close-range object at the maximum telephoto state.

11. The zoom lens of claim 1, further comprising a displacement means which causes the second lens group to move in a direction transverse to the optical axis.

12. The zoom lens of claim 2, further comprising a displacement means which causes the second lens group to move in a direction transverse to the optical axis.

13. The zoom lens of claim 3, further comprising a displacement means which causes the second lens group to move in a direction transverse to the optical axis.

14. The zoom lens of claim 5, further comprising a displacement means which causes the second lens group to move in a direction transverse to the optical axis.

15. The zoom lens of claim 7, further comprising a displacement means which causes the second lens group to move in a direction transverse to the optical axis.

16. The zoom lens of claim 11, wherein the second lens group contains at least one cemented lens.

17. The zoom lens of claim 12, wherein the second lens group contains at least one cemented lens.

18. The zoom lens of claim 13, wherein the second lens group contains at least one cemented lens.

19. The zoom lens of claim 14, wherein the second lens group contains at least one cemented lens.

20. The zoom lens of claim 15, wherein the second lens group contains at least one cemented lens.

21. The zoom lens of claim 1, wherein the following condition is satisfied:

$$1 < \Delta X3 / \Delta X2 < 10$$

where $\Delta X2$ is the displacement of the second lens group in the direction of the optical axis from the maximum wide-angle state to the maximum telephoto state, $\Delta X3$ is a displacement of the third lens group in the direction of the optical axis from the maximum wide-angle state to the maximum telephoto state.

22. The zoom lens of claim 2, wherein the following condition is satisfied:

$$1 < \Delta X3 / \Delta X2 < 10$$

where $\Delta X2$ is the displacement of the second lens group in the direction of the optical axis from the maximum wide-angle state to the maximum telephoto state, $\Delta X3$ is the displacement of the third lens group in a direction of the optical axis from the maximum wide-angle state to the maximum telephoto state.

23. The zoom lens of claim 3, wherein the following condition is satisfied:

$$1 < \Delta X3 / \Delta X2 < 10$$

where $\Delta X2$ is the displacement of the second lens group in the direction of the optical axis from the maximum wide-angle state to the maximum telephoto state, $\Delta X3$ is a displacement of the third lens group in the direction of the optical axis from the maximum wide-angle state to the maximum telephoto state.

24. The zoom lens of claim 5, wherein the following condition is satisfied:

$$1 < \Delta X3 / \Delta X2 < 10$$

where $\Delta X2$ is the displacement of the second lens group in the direction of the optical axis from the maximum wide-angle state to the maximum telephoto state, $\Delta X3$ is a displacement of the third lens group in the direction of the optical axis from the maximum wide-angle state to the maximum telephoto state.

25. The zoom lens of claim 7, wherein the following condition is satisfied:

$$1 < \Delta X3 / \Delta X2 < 10$$

where $\Delta X2$ is the displacement of the second lens group in the direction of the optical axis from the maximum wide-angle state to the maximum telephoto state, $\Delta X3$ is a displacement of the third lens group in the direction of the optical axis from the maximum wide-angle state to the maximum telephoto state.

26. The zoom lens of claim 11, wherein the following condition is satisfied:

$$1 < \Delta X3 / \Delta X2 < 10$$

where $\Delta X2$ is the displacement of the second lens group in the direction of the optical axis from the maximum wide-angle state to the maximum telephoto state, $\Delta X3$ is a displacement of the third lens group in the direction of the optical axis from the maximum wide-angle state to the maximum telephoto state.

27. The zoom lens of claim 16, wherein the following condition is satisfied:

$$1 < \Delta X3 / \Delta X2 < 10$$

where $\Delta X2$ is the displacement of the second lens group in the direction of the optical axis from the maximum wide-angle state to the maximum telephoto state, $\Delta X3$ is a displacement of the third lens group in the direction of the optical axis from the maximum wide-angle state to the maximum telephoto state.

* * * * *